US011982825B2

(12) United States Patent
Igeta et al.

(10) Patent No.: US 11,982,825 B2
(45) Date of Patent: May 14, 2024

(54) LIQUID CRYSTAL OPTICAL ELEMENT AND METHOD FOR MANUFACTURING THE SAME

(71) Applicants: Japan Display Inc., Tokyo (JP); OSAKA UNIVERSITY, Suita (JP)

(72) Inventors: Koichi Igeta, Tokyo (JP); Shinichiro Oka, Tokyo (JP); Yasushi Tomioka, Tokyo (JP); Hiroyuki Yoshida, Suita (JP)

(73) Assignees: Japan Display Inc., Tokyo (JP); Oaka University, Osaka (JP)

( * ) Notice: Subject to any disclaimer, the term of this patent is extended or adjusted under 35 U.S.C. 154(b) by 0 days.

(21) Appl. No.: 18/319,000

(22) Filed: May 17, 2023

(65) Prior Publication Data

US 2023/0375764 A1 Nov. 23, 2023

(30) Foreign Application Priority Data

May 17, 2022 (JP) ................................ 2022-080912

(51) Int. Cl.

| | |
|---|---|
| ***G02B 5/30*** | (2006.01) |
| ***C09K 19/36*** | (2006.01) |
| ***C09K 19/54*** | (2006.01) |
| ***G02B 5/18*** | (2006.01) |

(52) U.S. Cl.

CPC ............ *G02B 5/3016* (2013.01); *C09K 19/36* (2013.01); *C09K 19/54* (2013.01); *G02B 5/1833* (2013.01); *G02B 5/1857* (2013.01)

(58) Field of Classification Search

CPC .. G02B 5/3016; G02B 5/3083; G02B 5/1833; G02F 1/0063

See application file for complete search history.

(56) References Cited

U.S. PATENT DOCUMENTS

2016/0033698 A1 2/2016 Escuti et al.
2022/0113460 A1* 4/2022 Komura ............... G02B 5/3016

FOREIGN PATENT DOCUMENTS

WO WO-2016194961 A1 * 12/2016 ........... G02B 5/0252

* cited by examiner

*Primary Examiner* — Mariceli Santiago
(74) *Attorney, Agent, or Firm* — Maier & Maier, PLLC

(57) ABSTRACT

According to one embodiment, a liquid crystal optical element includes a transparent substrate including a main surface, an alignment film disposed on the main surface, and a liquid crystal layer overlapping the alignment film and including a cholesteric liquid crystal including liquid crystal molecules stacked helically and an additive exhibiting a liquid crystalline property. In the liquid crystal layer, a reflective surface along which alignment directions of the liquid crystal molecules are identical is inclined with respect to the main surface.

5 Claims, 24 Drawing Sheets

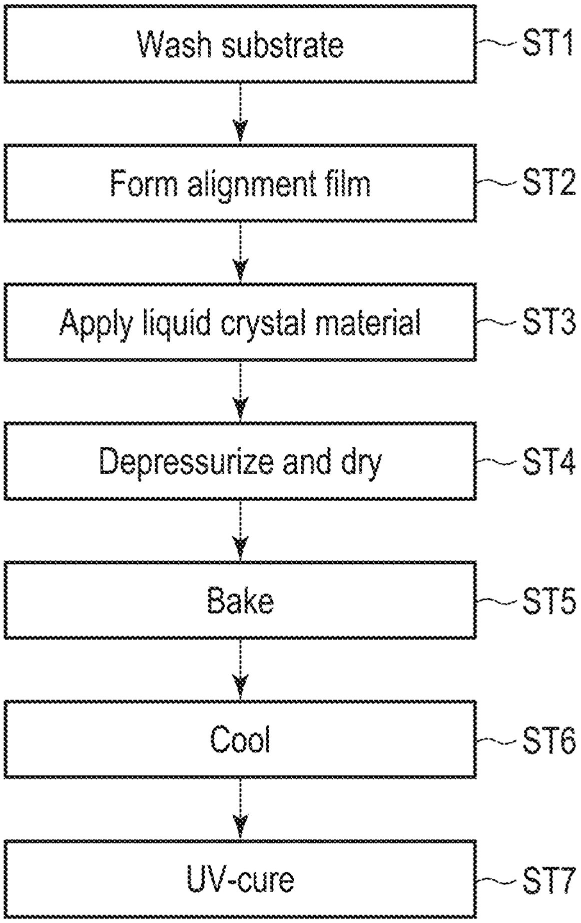
F I G. 10

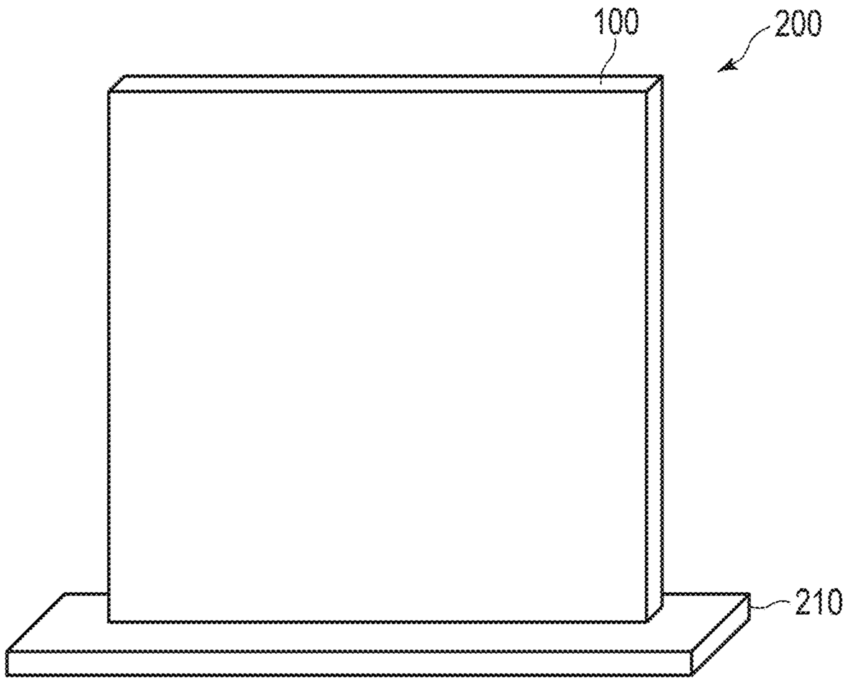
F I G. 25
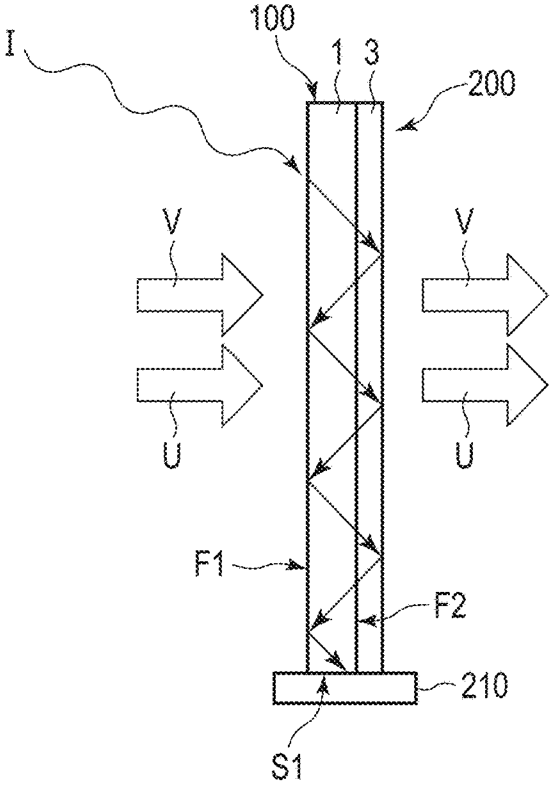
F I G. 26

LIQUID CRYSTAL OPTICAL ELEMENT AND METHOD FOR MANUFACTURING THE SAME

CROSS-REFERENCE TO RELATED APPLICATIONS

This application is based upon and claims the benefit of priority from Japanese Patent Application No. 2022-080912, filed May 17, 2022, the entire contents of which are incorporated herein by reference.

FIELD

Embodiments described herein relate generally to a liquid crystal optical element and method for manufacturing the same.

BACKGROUND

For example, liquid crystal polarization gratings for which liquid crystal materials are used have been proposed. In such liquid crystal polarization gratings, it is necessary to adjust parameters such as the grating period, the refractive anisotropy $\Delta n$ of a liquid crystal layer (difference between the refractive index ne for extraordinary light and the refractive index no for ordinary light of the liquid crystal layer), and the thickness d of the liquid crystal layer.

BRIEF DESCRIPTION OF THE DRAWINGS

FIG. 10 is a diagram for explaining a manufacturing method of the liquid crystal optical element 100 according to the embodiment.

FIG. 25 is a diagram showing an example of the outside of a photovoltaic cell device 200.

FIG. 26 is a diagram for explaining the operation of the photovoltaic cell device 200.

DETAILED DESCRIPTION

Figure 1:
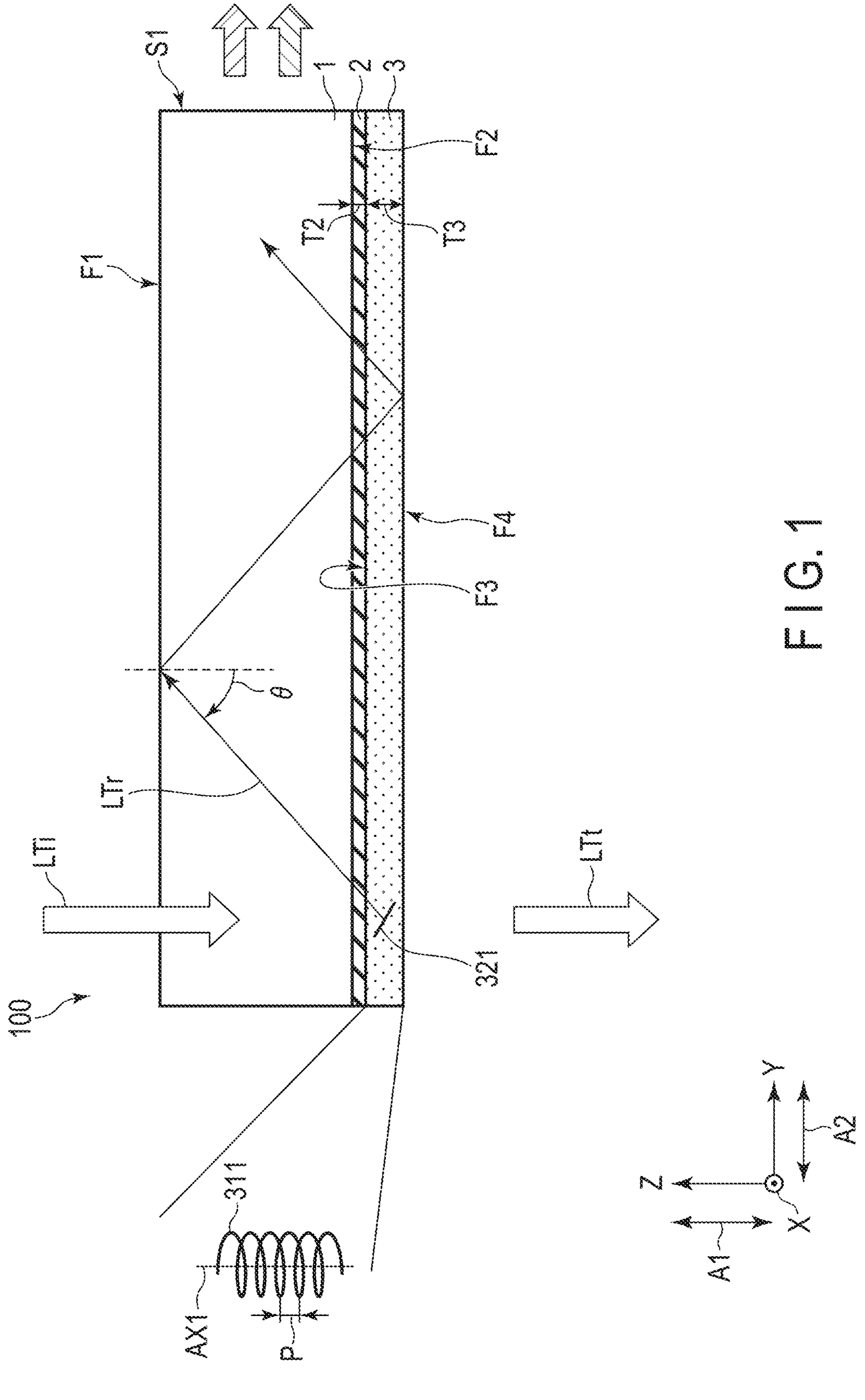
FIG. 1 is a cross-sectional view schematically showing a liquid crystal optical element 100 according to an embodiment.

In general, according to one embodiment, a liquid crystal optical element comprises a transparent substrate comprising a main surface, an alignment film disposed on the main surface, and a liquid crystal layer overlapping the alignment film and comprising a cholesteric liquid crystal including liquid crystal molecules stacked helically and an additive exhibiting a liquid crystalline property. In the liquid crystal layer, a reflective surface along which alignment directions of the liquid crystal molecules are identical is inclined with respect to the main surface.

According to another embodiment, a manufacturing method of a liquid crystal optical element, comprises forming an alignment film on a main surface of a transparent substrate, forming a liquid crystal layer on the alignment film, the liquid crystal layer comprising a cholesteric liquid crystal including liquid crystal molecules stacked helically, making additive exhibiting a liquid crystalline property or a liquid crystal solution including additive exhibiting a liquid crystalline property penetrate the liquid crystal layer, and drying the liquid crystal layer. In the liquid crystal layer, a reflective surface along which alignment directions of the liquid crystal molecules are identical is inclined with respect to the main surface.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the drawings, an X-axis, a Y-axis, and a Z-axis orthogonal to each other are described to facilitate understanding as necessary. A direction along the Z-axis is referred to as a Z direction or a first direction A1, a direction along the Y-axis is referred to as a Y direction or a second direction A2, and a direction along the X-axis is referred to as an X direction or a third direction A3. A plane defined by the X-axis and the Y-axis is referred to as an X-Y plane, a plane defined by the X-axis and the Z-axis is referred to as an X-Z plane, and a plane defined by the Y-axis and the Z-axis is referred to as a Y-Z plane.

FIG. 1 is a cross-sectional view schematically showing a liquid crystal optical element 100 according to a present embodiment.

The liquid crystal optical element 100 comprises a transparent substrate 1, an alignment film 2, and a liquid crystal layer 3.

The transparent substrate 1 is composed of, for example, a transparent glass plate or a transparent synthetic resin plate. The transparent substrate 1 may be composed of, for example, a transparent synthetic resin plate having flexibility. The transparent substrate 1 can assume an arbitrary shape. For example, the transparent substrate 1 may be curved.

In the present specification, "light" includes visible light and invisible light. For example, the wavelength of the lower limit of the visible light range is greater than or equal to 360 nm but less than or equal to 400 nm, and the wavelength of the upper limit of the visible light range is greater than or equal to 760 nm but less than or equal to 830 nm. Visible light includes a first component (blue component) of a first wavelength band (for example, 400 nm to 500 nm), a second component (green component) of a second wavelength band (for example, 500 nm to 600 nm), and a third component (red component) of a third wavelength band (for example, 600 nm to 700 nm). Invisible light includes ultraviolet rays of a wavelength band shorter than the first wavelength band and infrared rays of a wavelength band longer than the third wavelength band.

In the present specification, to be "transparent" should preferably be to be colorless and transparent. Note that to be "transparent" may be to be translucent or to be colored and transparent.

The transparent substrate 1 is formed into the shape of a flat plate along the X-Y plane, and comprises a first main surface (outer surface) F1, a second main surface (inner surface) F2, and a side surface S1. The first main surface F1 and the second main surface F2 are surfaces substantially parallel to the X-Y plane and are opposed to each other in the first direction A1. The side surface S1 is a surface extending in the first direction A1. In the example shown in FIG. 1, the side surface S1 is a surface substantially parallel to the X-Z plane, but the side surface S1 includes a surface substantially parallel to the Y-Z plane.

The alignment film 2 is disposed on the second main surface F2. The alignment film 2 is a horizontal alignment film having alignment restriction force along the X-Y plane. The alignment film 2 is, for example, an optical alignment film for which alignment treatment can be performed by light irradiation, but may be an alignment film for which alignment treatment is performed by rubbing or may be an alignment film having minute irregularities. The thickness T2 in the first direction A1 of the alignment film 2 is 5 nm to 300 nm, preferably 10 nm to 200 nm.

The liquid crystal layer 3 overlaps the alignment film 2 in the first direction A1. That is, the alignment film 2 is located between the transparent substrate 1 and the liquid crystal layer 3, and is in contact with the transparent substrate 1 and the liquid crystal layer 3.

The liquid crystal layer 3 comprises a third main surface (inner surface) F3 and a fourth main surface (outer surface) F4. The third main surface F3 and the fourth main surface F4 are surfaces substantially parallel to the X-Y plane and are opposed to each other in the first direction A1. The third main surface F3 is in contact with the alignment film 2. The thickness T3 in the first direction A1 of the liquid crystal layer 3 is greater than the thickness T2, is for example, 1 μm to 10 μm, preferably 2 μm to 7 μm.

The fourth main surface F4 may be covered by a transparent protective layer.

As schematically shown in an enlarged manner, the liquid crystal layer 3 comprises a cholesteric liquid crystal 311 turning in a first turning direction. The cholesteric liquid crystal 311 has a helical axis AX1 substantially parallel to the first direction A1 and has a helical pitch P in the first direction A1. The helical pitch P indicates one cycle of the helix (layer thickness along the helical axis AX1 necessary for liquid crystal molecules to rotate 360 degrees).

The liquid crystal layer 3 comprises a reflective surface 321. The reflective surface 321 reflects, of the light incident on the liquid crystal layer 3, circularly polarized light of a selective reflection band determined according to the helical pitch P of the cholesteric liquid crystal 311 and the refractive anisotropy $\Delta n$ of the liquid crystal layer 3. For example, if the first turning direction is right-handed, right-handed circularly polarized light is reflected by the reflective surface 321, and if the first turning direction is left-handed, left-handed circularly polarized light is reflected by the reflective surface 321. In the present specification, "reflection" in the liquid crystal layer 3 involves diffraction inside the liquid crystal layer 3. In addition, in the present specification, circularly polarized light may be precise circularly polarized light or may be circularly polarized light approximate to elliptically polarized light.

In the example shown in FIG. 1, the liquid crystal layer 3 is configured to reflect part of light LTi incident from the first main surface F1 side toward the transparent substrate 1. The liquid crystal layer 3 also can be configured to reflect part of light incident from the fourth main surface F4 side. In addition, in the liquid crystal optical element 100, a liquid crystal layer comprising another cholesteric liquid crystal may be stacked on the liquid crystal layer 3 shown in FIG. 1. The other cholesteric liquid crystal is, for example, a cholesteric liquid crystal having a helical pitch different from the helical pitch P or a cholesteric liquid crystal turning in a second turning direction opposite to the first turning direction.

The optical action of the liquid crystal optical element 100 shown in FIG. 1 will be described next.

Light LTi incident on the liquid crystal optical element 100 includes, for example, visible light, ultraviolet rays, and infrared rays.

In the example shown in FIG. 1, to facilitate understanding, light LTi is incident substantially perpendicularly to the transparent substrate 1. The angle of incidence of light LTi to the transparent substrate 1 is not particularly limited. For example, light LTi may be incident on the transparent substrate 1 at angles of incidence different from each other.

Light LTi enters the inside of the transparent substrate 1 from the first main surface F1, is emitted from the second main surface F2, is transmitted through the alignment film 2, and is incident on the liquid crystal layer 3. Then, the liquid crystal layer 3 reflects part of light LTi. For example, the liquid crystal layer 3 reflects first circularly polarized light of infrared rays toward the transparent substrate 1 and transmits other light LTt.

The liquid crystal layer 3 reflects first circularly polarized light toward the transparent substrate 1 at an angle θ of entry which satisfies the conditions for optical waveguide in the transparent substrate 1. The angle θ of entry here corresponds to an angle greater than or equal to the critical angle θc which causes total reflection at the interface between the transparent substrate 1 and the air. The angle θ of entry indicates an angle to a perpendicular line orthogonal to the transparent substrate 1.

If the transparent substrate 1, the alignment film 2, and the liquid crystal layer 3 have equivalent refractive indices, the stacked layer body of these can be a single light guide element. In this case, light LTr is guided inside the liquid crystal optical element 100 toward the side surface S1 while being repeatedly reflected at the interface between the transparent substrate 1 and the air and the interface between the liquid crystal layer 3 and the air.

While the example in which infrared rays I are reflected has been explained here, the liquid crystal layer 3 may be configured to reflect visible light, or may be configured to reflect ultraviolet rays, or may be configured to reflect light of wavelength bands.

Figure 2:
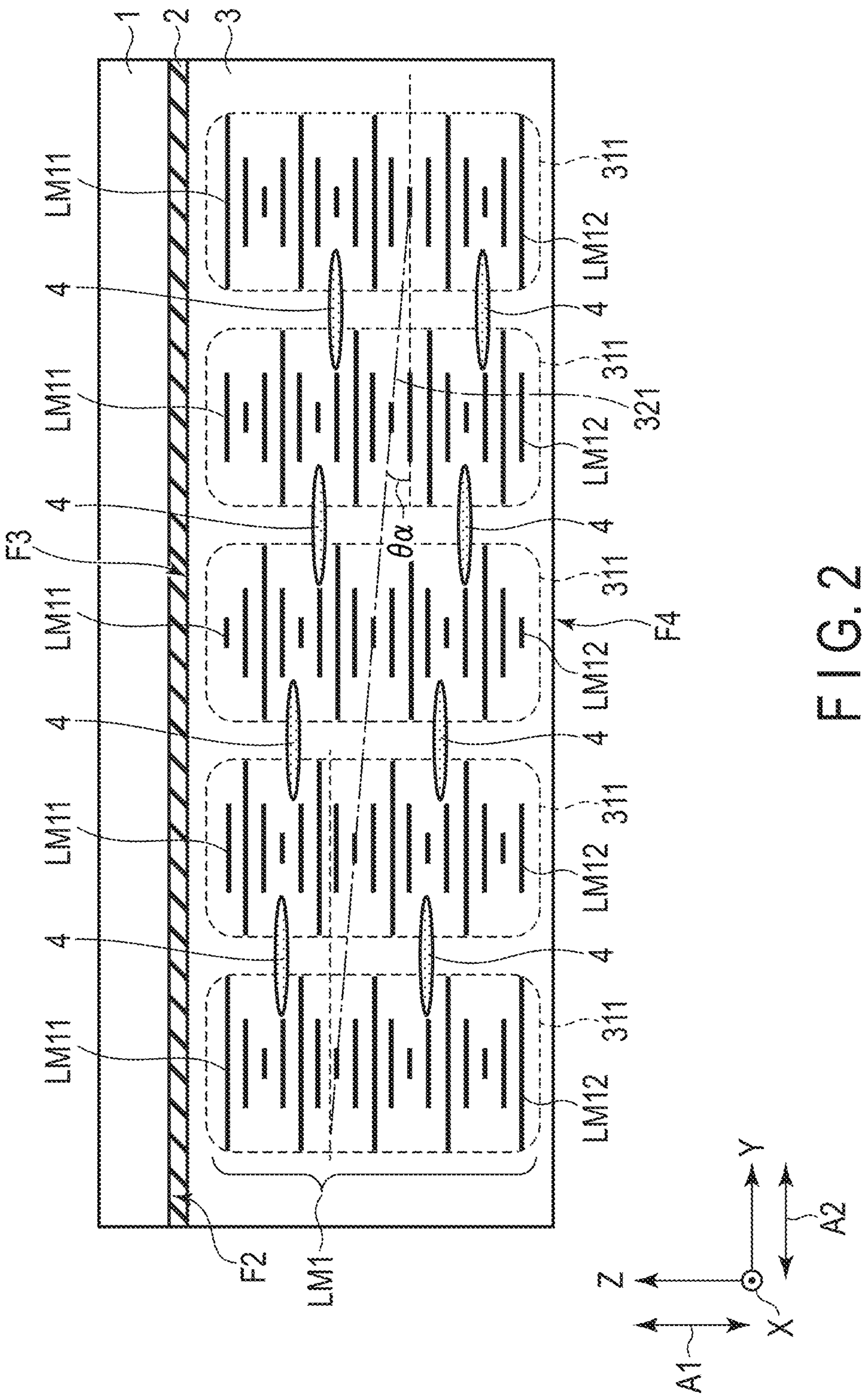
FIG. 2 is a diagram for explaining an example of cholesteric liquid crystals 311 included in a liquid crystal layer 3.

FIG. 2 is a diagram for explaining an example of cholesteric liquid crystals 311 included in the liquid crystal layer 3.

In FIG. 2, the liquid crystal layer 3 is shown in a state of being enlarged in the first direction A1. In addition, for the sake of simplification, one liquid crystal molecule LM1 of the liquid crystal molecules located in the same plane parallel to the X-Y plane is shown in the figure as liquid crystal molecules LM1 constituting the cholesteric liquid crystals 311. The alignment direction of the liquid crystal molecule LM1 shown in the figure corresponds to the average alignment direction of the liquid crystal molecules located in the same plane.

The liquid crystal layer 3 comprises the cholesteric liquid crystals 311 and additive (guest liquid crystals) 4 exhibiting liquid crystalline properties.

Each cholesteric liquid crystal 311 is constituted of liquid crystal molecules LM1 helically stacked in the first direction A1 while being turned. The liquid crystal molecules LM1 comprise a liquid crystal molecule LM11 on one end side of the cholesteric liquid crystals 311 and a liquid crystal molecule LM12 on the other end side of the cholesteric liquid crystals 311. The liquid crystal molecule LM11 is close to the third main surface F3 or the alignment film 2. The liquid crystal molecule LM12 is close to the fourth main surface F4.

In the liquid crystal layer 3 of the example shown in FIG. 2, the alignment directions of the cholesteric liquid crystals 311 adjacent to each other in the second direction A2 are different from each other. In addition, the respective spatial phases of the cholesteric liquid crystals 311 adjacent to each other in the second direction A2 are different from each other. Moreover, the alignment directions of the liquid crystal molecules LM11 change continuously in the second direction A2. Furthermore, the alignment directions of the liquid crystal molecules LM12 also change continuously in the second direction A2.

The reflective surface 321 of the liquid crystal layer 3 is inclined with respect to the second main surface F2 or the X-Y plane. The angle θα formed by the reflective surface 321 and the X-Y plane is an acute angle. The reflective surface 321 here corresponds to a surface along which the alignment directions of the liquid crystal molecules LM1 are identical or a surface along which the spatial phases are the same (equiphase wave surface). The angle θα corresponds to the angle of inclination of the reflective surface 321 with respect to the second main surface F2.

The shape of the reflective surface 321 is not limited to a planar shape as shown in FIG. 2, but may be a curved surface such as a concave shape or a convex shape and is not particularly limited. In addition, part of the reflective surface 321 may have irregularities, or the angles θα of inclination of reflective surfaces 321 may not be uniform, or reflective surfaces 321 may not be arranged regularly. According to the spatial phase distribution of the cholesteric liquid crystals 311, the reflective surface 321 having an arbitrary shape can be formed.

The above-described liquid crystal layer 3 is cured in a state where the alignment directions of the liquid crystal molecules LM1 are fixed. That is, the alignment directions of the liquid crystal molecules LM1 are not controlled in accordance with an electric field. For this reason, in the example illustrated, the liquid crystal optical element 100 does not comprise an electrode for forming an electric field in the liquid crystal layer 3.

In the example shown in the figure, the additive 4 penetrates the liquid crystal layer 3 substantially uniformly. The additive 4 is aligned in the same manner as the cholesteric liquid crystals 311. The additive 4 has refractive anisotropy Δn4. The refractive anisotropy Δn4 is greater than the refractive anisotropy Δn3 of the cholesteric liquid crystals 311. For this reason, the refractive anisotropy Δn of the liquid crystal layer 3 increases by the amount of additive 4 added to the liquid crystal layer 3. The refractive anisotropy Δn never exceeds the refractive anisotropy Δn4. That is, the refractive anisotropy Δn4 is greater than the refractive anisotropy Δn.

In general, in the liquid crystal layer 3 comprising the cholesteric liquid crystals 311, the selective reflection band Δλ for perpendicularly incident light is expressed as equation (1) below, based on the helical pitch P of the cholesteric liquid crystals 311 and the refractive anisotropy Δn of the liquid crystal layer 3 (difference between the refractive index ne for extraordinary light and the refractive index no for ordinary light).

$$\Delta\lambda=\Delta n*P \tag{1}$$

The specific wavelength range of the selective reflection band Δλ is greater than or equal to no*P but less than or equal to ne*P, and is for example, a near-infrared range of greater than or equal to 800 nm but less than or equal to 1000 nm.

The center wavelength λm of the selective reflection band Δλ is expressed as equation (2) below, based on the helical pitch P of the cholesteric liquid crystals 311 and the average refractive index nav (=(ne+no)/2) of the liquid crystal layer 3.

$$\lambda m=nav*P \tag{2}$$

According to the above equation (1), in order to meet a request to enlarge the selective reflection band Δλ, the refractive anisotropy Δn or the helical pitch P needs to be increased. However, as indicated by the above equation (2), the helical pitch P affects the center wavelength λm as well. For this reason, in order to enlarge the selective reflection band Δλ while suppressing the shift of the center wavelength λm to a long wavelength side, increasing the refractive anisotropy Δn is effective.

According to the present embodiment, the liquid crystal layer 3 comprises the additive 4 in addition to the cholesteric liquid crystals 311. The refractive anisotropy Δn4 of the additive 4 is greater than the refractive anisotropy Δn3 of the cholesteric liquid crystals 311. For this reason, the refractive anisotropy Δn of the liquid crystal layer 3 can be increased compared to that in a case where the liquid crystal layer 3 does not comprise the additive 4. It is therefore possible to enlarge the selective reflection band Δλ in the liquid crystal layer 3.

In addition, even if it is hard to select a material for achieving desired refractive anisotropy Δn as a material for forming the cholesteric liquid crystals 311, the desired refractive anisotropy Δn can be easily achieved by adjusting the amount of added additive 4.

Figure 3:
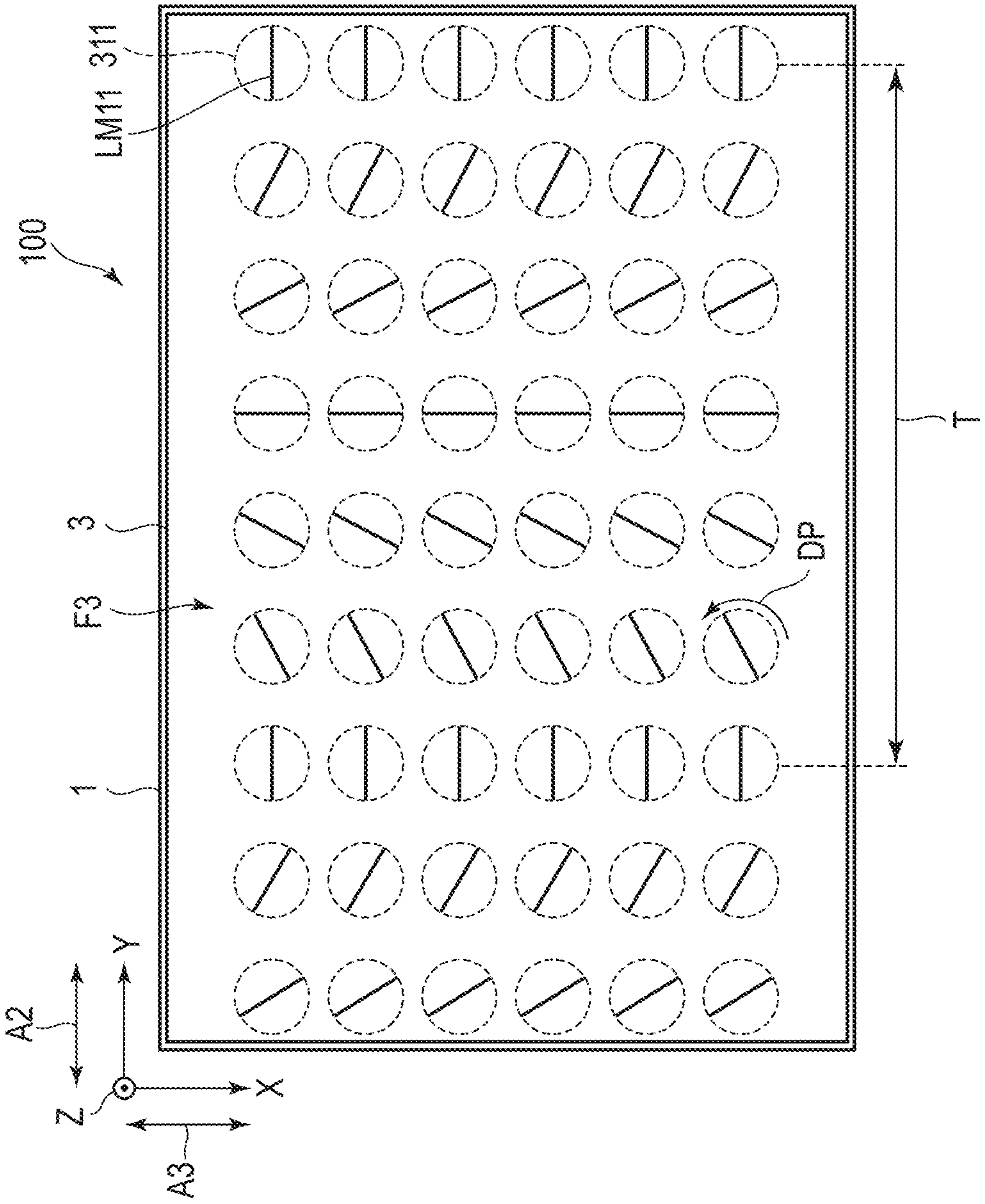
FIG. 3 is a plan view schematically showing the liquid crystal optical element 100.

FIG. 3 is a plan view schematically showing the liquid crystal optical element 100.

FIG. 3 shows an example of the spatial phases of the cholesteric liquid crystals 311. The spatial phases here are shown as the alignment directions of the liquid crystal molecules LM11 located close to the third main surface F3, of the liquid crystal molecules LM1 included in the cholesteric liquid crystals 311.

The alignment directions of the liquid crystal molecules LM11 differ from each other between each cholesteric liquid crystal 311 arranged in the second direction A2. That is, the spatial phases of the cholesteric liquid crystals 311 are different in the second direction A2.

In contrast, the alignment directions of the liquid crystal molecules LM11 are substantially identical between each cholesteric liquid crystal 311 arranged in the third direction A3. That is, the spatial phases of the cholesteric liquid crystals 311 are substantially same in the third direction A3.

In particular, in the cholesteric liquid crystals 311 arranged in the second direction A2, the respective alignment directions of the liquid crystal molecules LM11 differ by equal angles. That is, the alignment directions of the liquid crystal molecules LM11 arranged in the second direction A2 change linearly. Accordingly, the spatial phases of the cholesteric liquid crystals 311 arranged in the second direction A2 change linearly in the second direction A2. As a result, as in the liquid crystal layer 3 shown in FIG. 2, the reflective surface 321 inclined with respect to the X-Y plane is formed. The phrase "linearly change" here means, for example, that the amount of change of the alignment directions of the liquid crystal molecules LM11 is represented by a linear function. The alignment directions of the liquid crystal molecules LM11 here correspond to the major-axis directions of the liquid crystal molecules LM11 in the X-Y plane. The above-described alignment directions of the liquid crystal molecules LM11 are controlled by the alignment treatment performed for the alignment film 2.

Here, as shown in FIG. 3, in one plane, the interval between two liquid crystal molecules LM11 between which the alignment directions change by 180 degrees in the second direction A2 is defined as a cycle T. In FIG. 3, DP denotes the turning direction of the liquid crystal molecules LM11. The angle θα of inclination of the reflective surface 321 shown in FIG. 2 is set as appropriate by the cycle T and the helical pitch P.

Material examples which can be applied as the above-described additive 4 will be described here with reference to FIG. 4 to FIG. 9.

Figure 4:
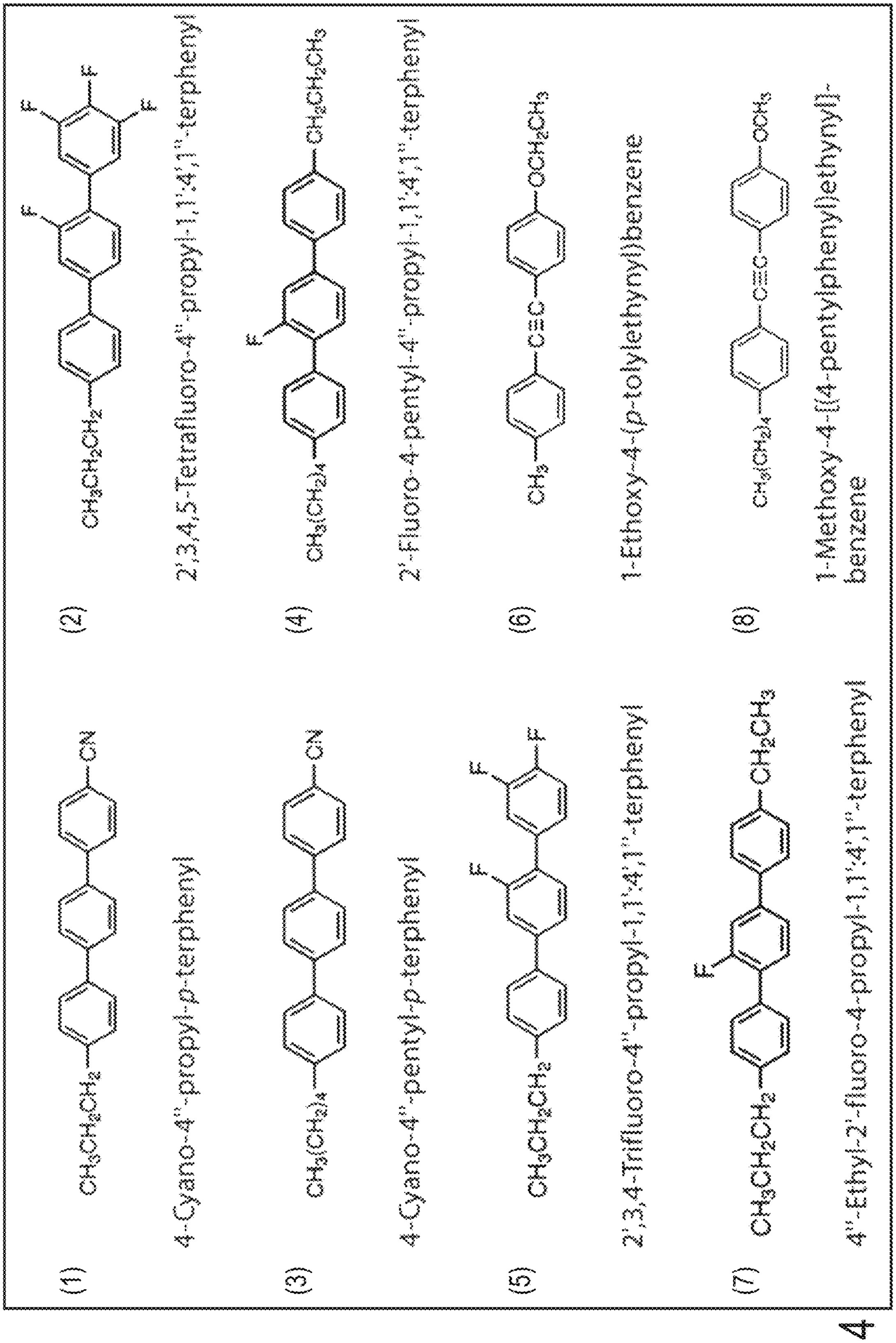
FIG. 4 is a diagram showing material examples which can be applied as additive 4 in the embodiment.
Figure 5:
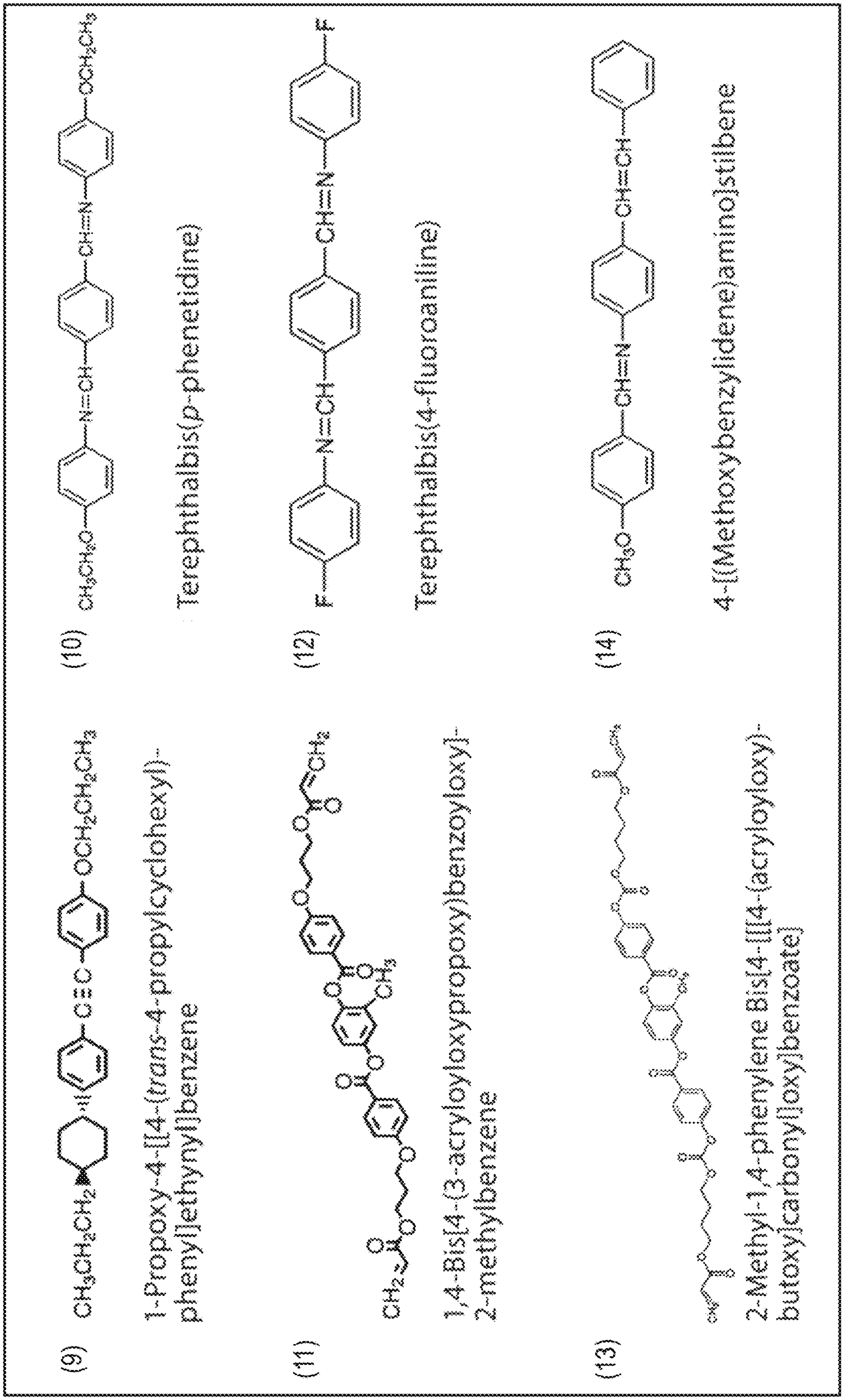
FIG. 5 is a diagram showing material examples which can be applied as the additive 4 in the embodiment.

Material examples (1) to (8) shown in FIG. 4 and material examples (9) to (14) shown in FIG. 5 are examples of nematic liquid crystal materials and smectic liquid crystal materials, and are cyanobiphenyl-based materials and analogs thereof, fluorinated biphenyl-based materials and analogs thereof, other biphenyl-based materials and analogs thereof, phenyl ester-based materials, and Schiff base-based materials.

Figure 6:
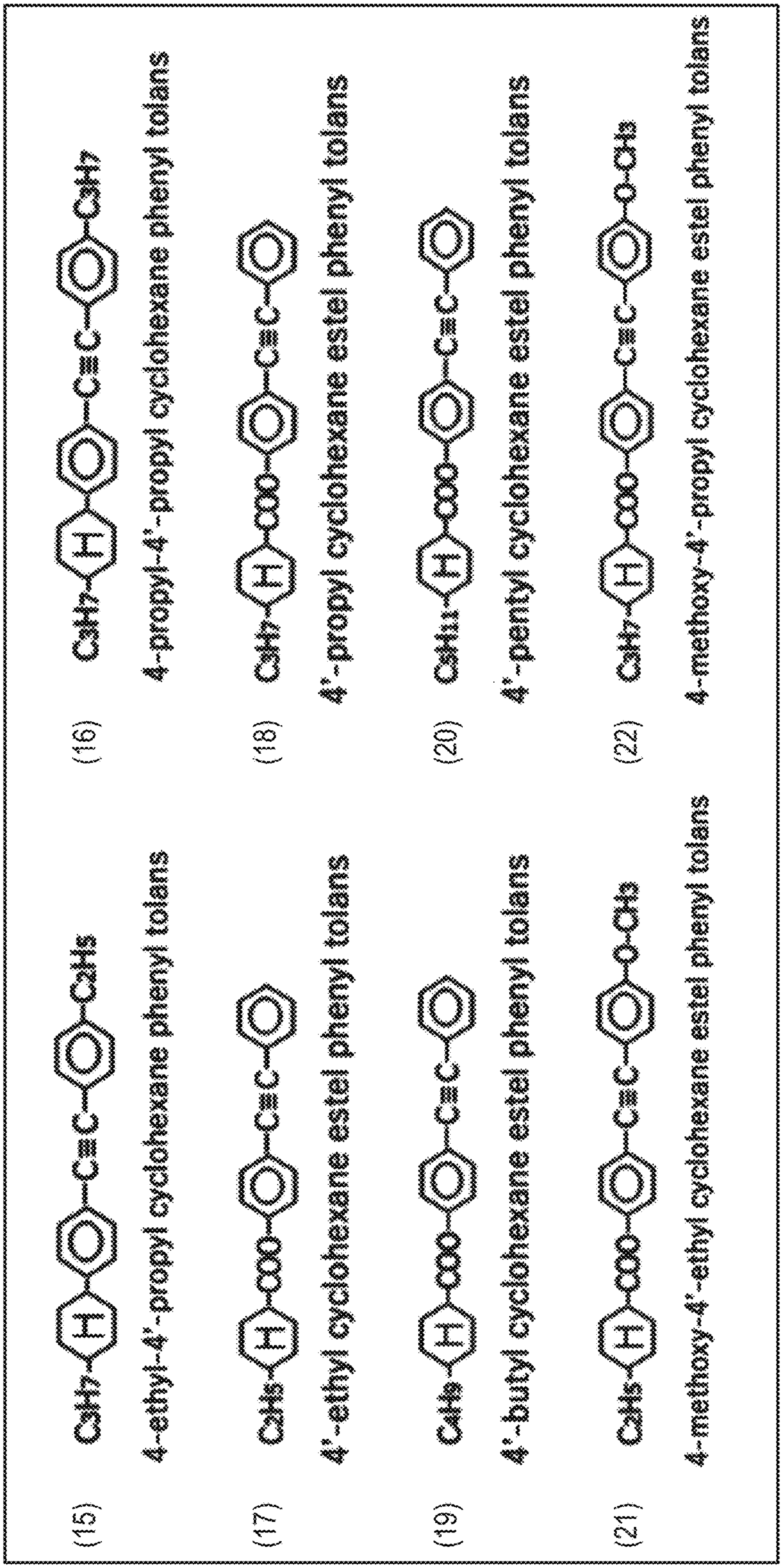
FIG. 6 is a diagram showing material examples which can be applied as the additive 4 in the embodiment.
Figure 7:
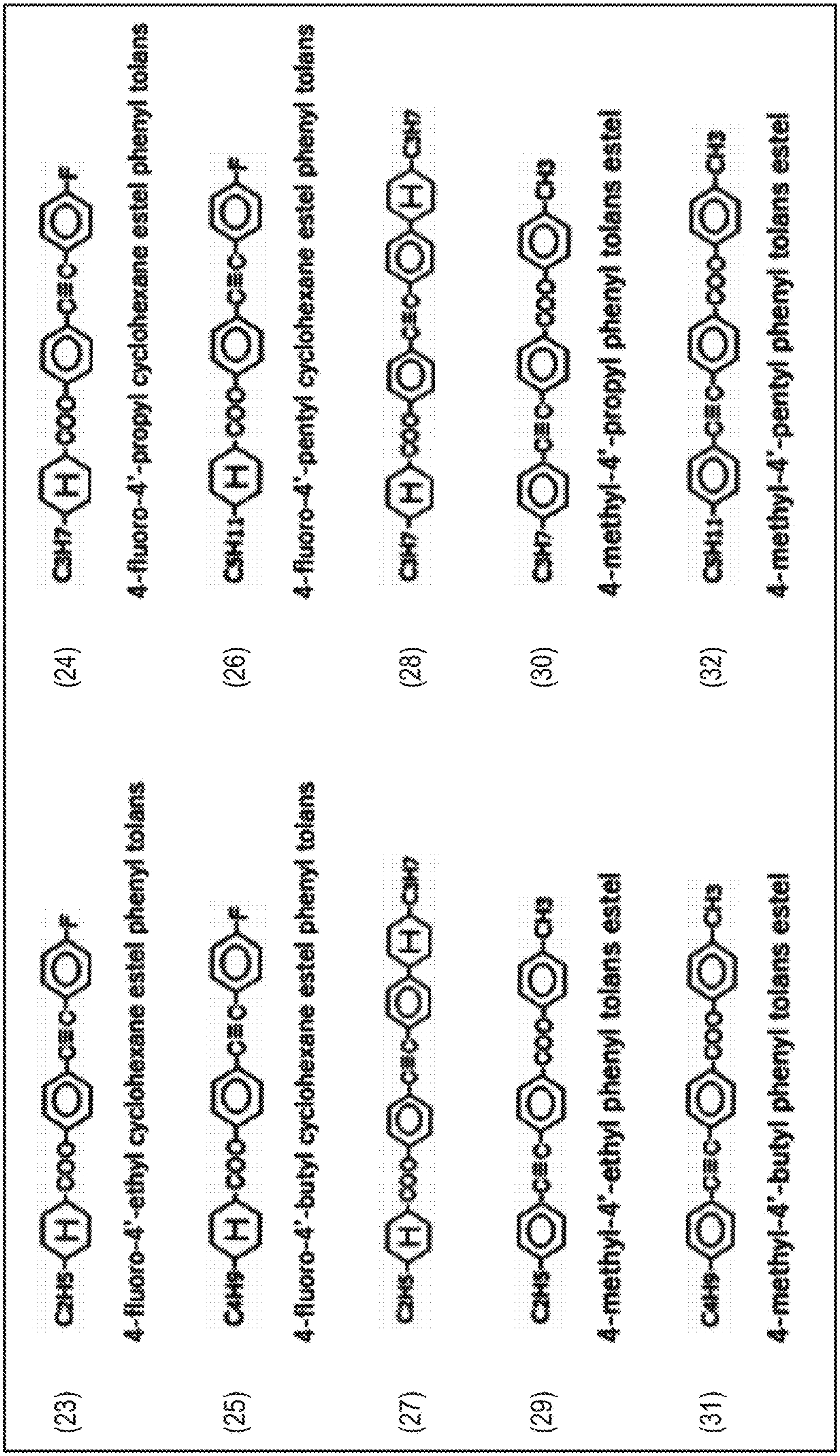
FIG. 7 is a diagram showing material examples which can be applied as the additive 4 in the embodiment.
Figure 8:
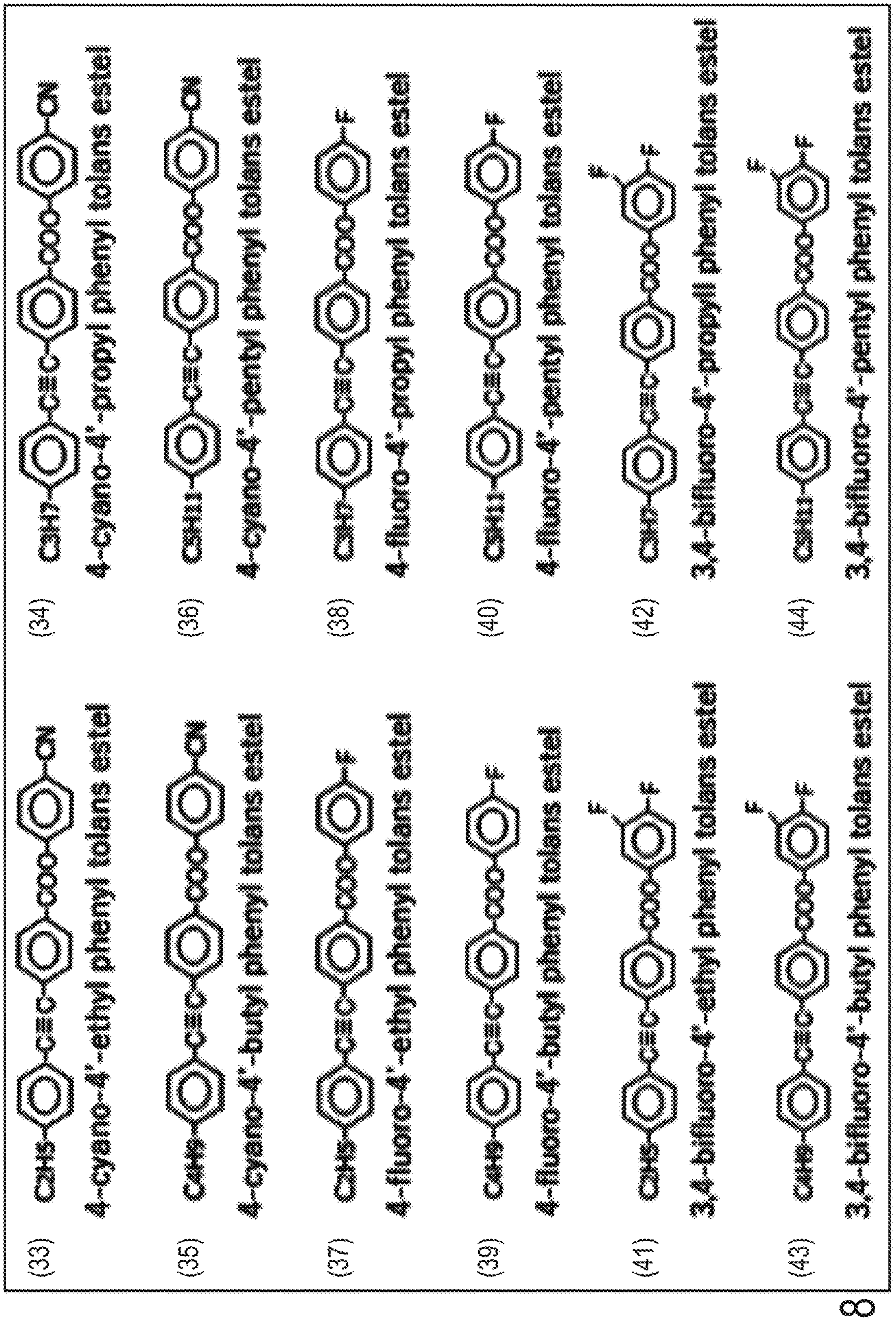
FIG. 8 is a diagram showing material examples which can be applied as the additive 4 in the embodiment.

Material examples (15) to (44) shown in FIG. 6 to FIG. 8 are examples of nematic liquid crystal materials and smectic liquid crystal materials, and are tolan-based materials.

Material examples (15) and (16) are cyclohexane phenyl tolan-based materials.

Material examples (17) to (20) are cyclohexane ester phenyl tolan-based materials.

Material examples (21) and (22) are alkoxy cyclohexane ester phenyl tolan-based materials.

Material examples (23) to (26) are fluoro cyclohexane ester phenyl tolan-based materials.

Material examples (27) and (28) are tetracyclic ester tolan-based materials.

Material examples (29) to (32) are phenyl tolan ester-based materials.

Material examples (33) to (36) are cyano phenyl tolan ester-based materials.

Material examples (37) to (40) are fluoro phenyl tolan ester-based materials.

Material examples (41) to (44) are bifluoro phenyl tolan ester-based materials.

Figure 9:
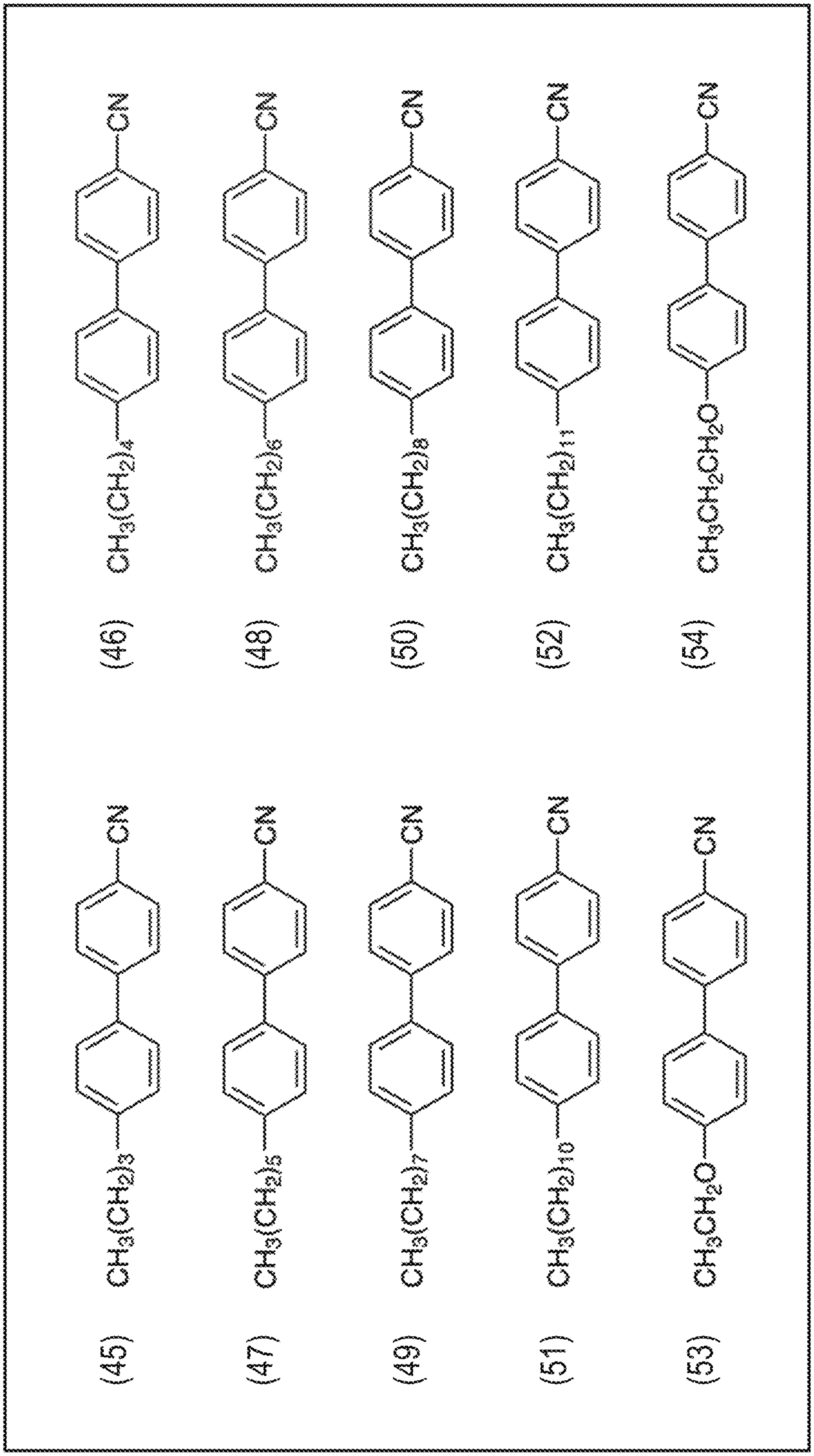
FIG. 9 is a diagram showing material examples which can be applied as the additive 4 in the embodiment.

Material examples (45) to (54) shown in FIG. 9 are examples of nematic liquid crystal materials and smectic liquid crystal materials, and are cyano biphenyl-based materials and analogs thereof.

A manufacturing method of the liquid crystal optical element 100 will be described with reference to FIG. 10.

First, the transparent substrate 1 is washed (step ST1).

Then, the alignment film 2 is formed on the second main surface F2 of the transparent substrate 1 (step ST2). The alignment film 2 is subjected to predetermined alignment treatment. At this time, the alignment treatment (optical alignment treatment) of the alignment film 2 is performed so as to form, for example, the alignment pattern of the liquid crystal molecules LM11 as shown in FIG. 3.

Then, a liquid crystal material (solution including a monomeric material for forming cholesteric liquid crystals) is applied to the alignment film 2 (step ST3). Then, a solvent is dried by depressurizing the inside of a chamber (step ST4) to further bake the liquid crystal material (step ST5). Through the baking, the liquid crystal molecules included in the liquid crystal material are aligned in a predetermined direction in accordance with the direction of the alignment treatment of the alignment film 2. Then, the liquid crystal material is cooled to room temperature or so (step ST6), and after that, the liquid crystal material is irradiated with ultraviolet rays and the liquid crystal material is cured (step ST7). The liquid crystal layer 3 comprising the cholesteric liquid crystals 311 is thereby formed.

The step of making the additive 4 penetrate the liquid crystal layer 3 will be described hereinafter.

Figure 11:
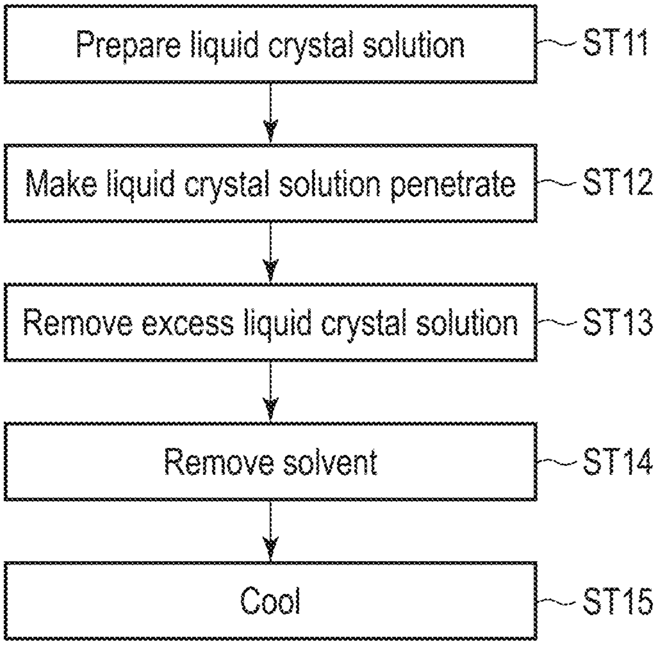
FIG. 11 is a diagram showing an example of the step of making the additive 4 penetrate the liquid crystal layer 3.

FIG. 11 is a diagram showing an example of the step of making the additive 4 penetrate the liquid crystal layer 3.

First, a liquid crystal solution obtained by dissolving the above additive 4 in a solvent is prepared (step ST11). As the solvent, organic solvents such as hexane, cyclohexane, cyclohexanone, heptane, toluene, anisole, propylene glycol monomethyl ether acetate (PGMEA) can be applied.

Then, the liquid crystal solution is made penetrate the liquid crystal layer 3 (step ST12). The penetration process here includes soaking the liquid crystal layer 3 in the liquid crystal solution and dropping the liquid crystal solution on the liquid crystal layer 3. The additive 4 included in the liquid crystal solution, together with the solvent, thereby penetrates the liquid crystal layer 3 uniformly.

Then, excess liquid crystal solution is removed by using a spinner or the like (step ST13). As necessary, an organic solvent for removing liquid crystal solution may be used.

Then, the solvent, which has penetrated the liquid crystal layer 3, is removed by heating the transparent substrate 1, etc., to dry the liquid crystal layer 3 (step ST14). Then, the transparent substrate 1 is cooled to room temperature or so (step ST15).

The amount of additive 4 added to the liquid crystal layer 3 can be adjusted by the number of times the above-described steps ST12 to ST15 are carried out. That is, if it is required that the amount of added additive 4 be increased, steps ST12 to ST15 are carried out repeatedly more than once. In this way, the liquid crystal optical element 100 having desired reflective performance is manufactured.

Figure 12:
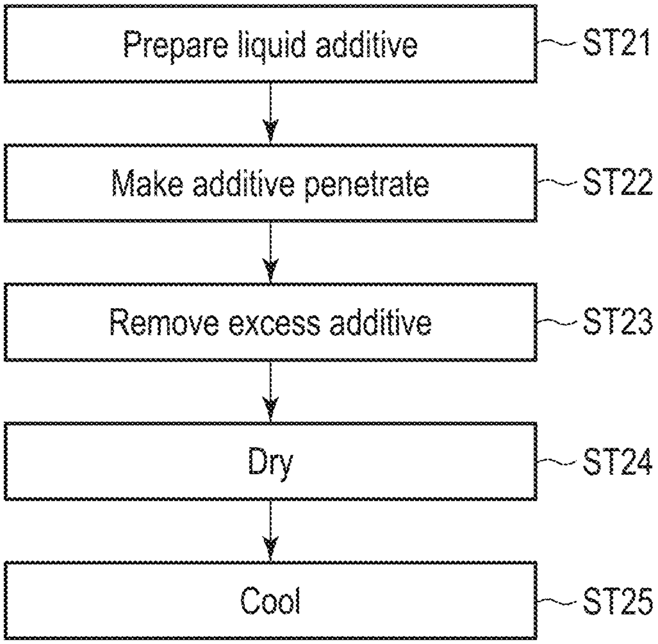
FIG. 12 is a diagram showing another example of the step of making the additive 4 penetrate the liquid crystal layer 3.

FIG. 12 is a diagram showing another example of the step of making the additive 4 penetrate the liquid crystal layer 3.

First, the liquid additive 4 is prepared (step ST21). The liquid additive 4 can be obtained by heating the additive 4 to the temperature of a nematic-isotropic transition temperature (NI point) or higher as necessary.

Then, the liquid additive 4 is made to penetrate the liquid crystal layer 3 (step ST22). The penetration process here includes soaking the liquid crystal layer 3 in the additive 4 and dropping the additive 4 on the liquid crystal layer 3. The liquid additive 4 thereby penetrates the liquid crystal layer 3 uniformly.

After that, excess additive 4 is removed by using a spinner or the like (step ST23). As necessary, an organic solvent for removing excess additive 4 may be used.

Then, the liquid crystal layer 3 is dried by heating the transparent substrate 1 (step ST24).

Then, the transparent substrate 1 is cooled to room temperature or so (step ST15).

The amount of additive 4 added to the liquid crystal layer 3 can be adjusted by the number of times the above-described steps ST22 to ST25 are carried out. That is, if it is required that the amount of added additive 4 be increased, steps ST22 to ST25 are carried out repeatedly more than once. In this way, the liquid crystal optical element 100 having desired reflective performance is manufactured.

Figure 13:
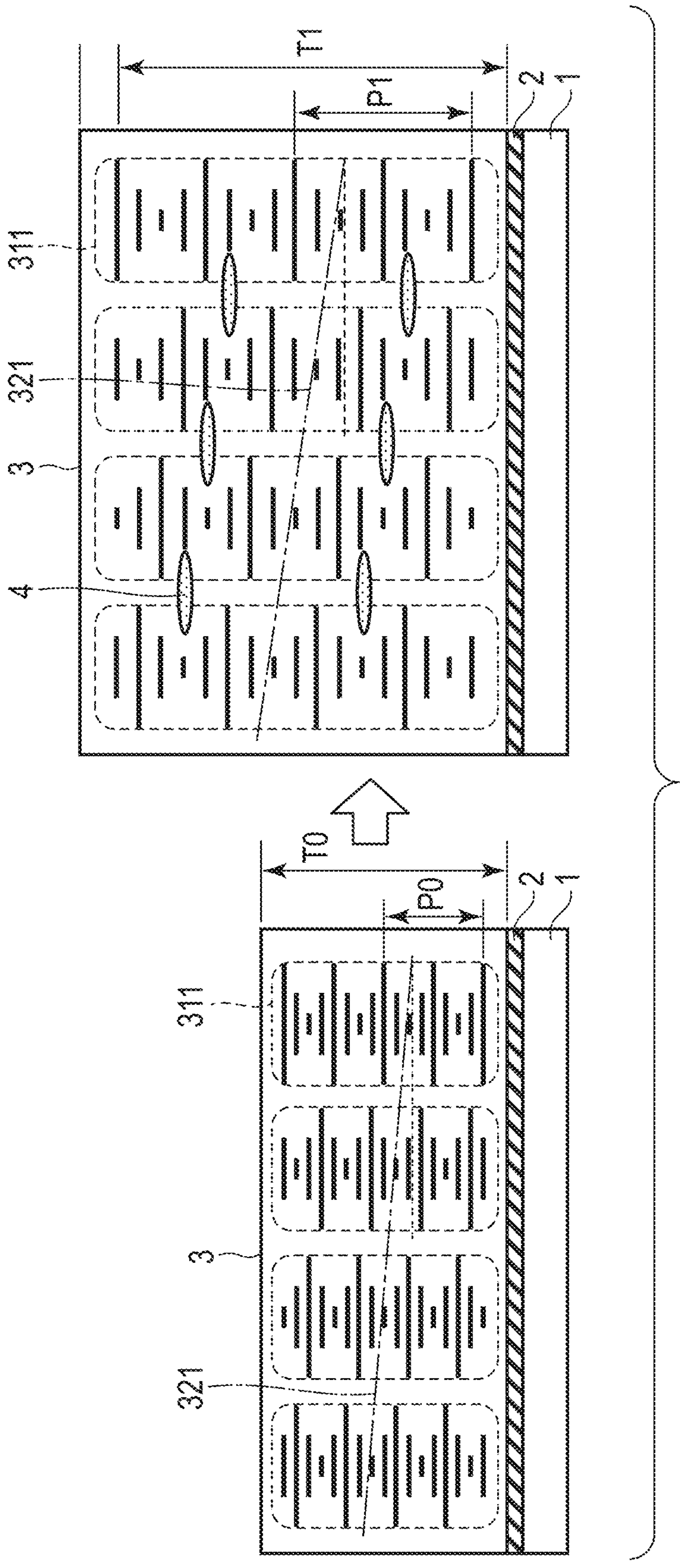
FIG. 13 is a diagram for explaining how the additive 4 penetrates the liquid crystal layer 3.

FIG. 13 is a diagram for explaining how the additive 4 penetrates the liquid crystal layer 3.

The left side of the figure schematically shows the state of the liquid crystal layer 3 before the additive 4 penetrates the liquid crystal layer 3. The liquid crystal layer 3 has a thickness TO. The cholesteric liquid crystals 311 included in the liquid crystal layer 3 have a helical pitch P0.

The right side of the figure schematically shows the state of the liquid crystal layer 3 into which the additive 4 penetrates. The liquid crystal layer 3 swells because of the penetration by the additive 4. That is, the thickness T1 of the liquid crystal layer 3 is greater than the thickness TO. In addition, the helical pitch P1 of the cholesteric liquid crystals 311 included in the liquid crystal layer 3 is greater than the helical pitch P0. As the helical pitch becomes greater, the angle of inclination of the reflective surface 321 formed in the liquid crystal layer 3 also becomes greater.

Several Examples will be described hereinafter.

Example 1

First, the liquid crystal layer 3 is formed through steps ST1 to ST7 shown in FIG. 10.

Then, through steps ST11 to ST15 shown in FIG. 11, the additive 4 is made to penetrate the liquid crystal layer 3, and a liquid crystal optical element is prepared. In the liquid crystal solution prepared in step ST11, cyclohexanone is applied as a solvent, and 4-Cyano-4"-pentyl-p-terphenyl (another name: 5CT) is applied as the additive 4.

As a comparative example, the liquid crystal layer 3 is formed of the same liquid crystal material as that of Example 1 and a liquid crystal optical element which is not penetrated by the additive 4 is prepared.

Figure 14:
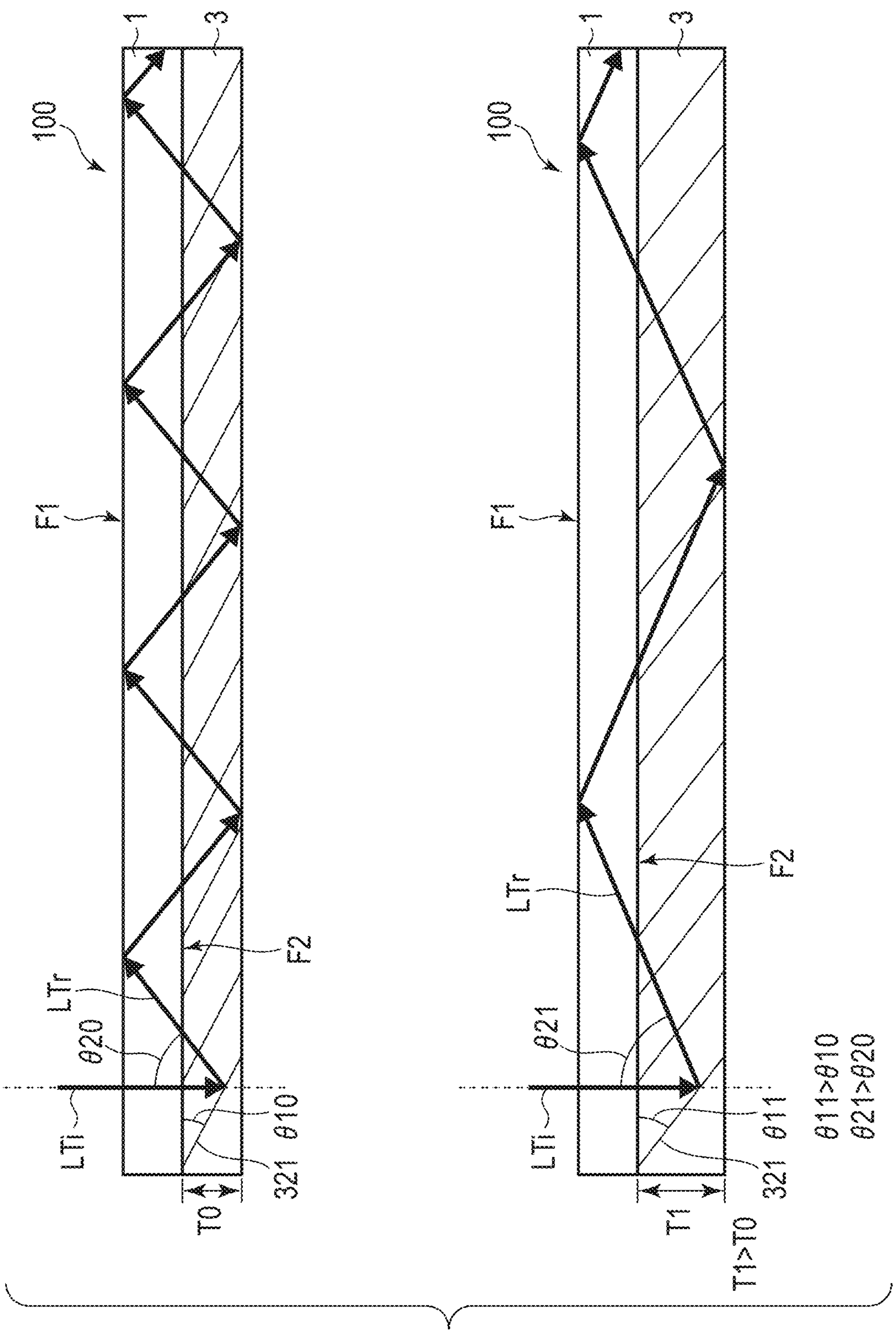
FIG. 14 is a diagram for explaining the optical action of the liquid crystal optical element.

FIG. 14 is a diagram for explaining the optical action of the liquid crystal optical element. In the figure, the normal of the transparent substrate 1 is indicated by a broken line. FIG. 14 shows light LTi incident on the liquid crystal optical element 100 along the normal and light LTr reflected by the reflective surface 321, and the illustration of light transmitted through the liquid crystal optical element 100 is omitted. In addition, in FIG. 14, the illustration of an alignment film between the transparent substrate 1 and the liquid crystal layer 3 is omitted.

The upper part of FIG. 14 shows the optical action of the liquid crystal optical element 100, in which the additive 4 does not penetrate the liquid crystal layer 3 (comparative example). The angle formed by the reflective surface 321 formed in the liquid crystal layer 3 having the thickness TO and the second main surface F2 is expressed as an angle θ10 of inclination. The angle formed by light LTi incident along the normal and light LTr reflected by the reflective surface 321 is expressed as an angle θ20 of reflection. For example, the thickness T0 is 3.23 μm. In addition, a cross-sectional photograph taken by an electron microscope is checked to find that the angle θ10 of inclination is 38° and the helical pitch P0 is 534 nm.

The lower part of FIG. 14 shows the optical action of the liquid crystal optical element 100, in which the additive 4 penetrates the liquid crystal layer 3 (Example 1). The angle formed by the reflective surface 321 formed in the liquid crystal layer 3 having the thickness T1 and the second main surface F2 is expressed as an angle θ11 of inclination. The angle θ11 of inclination is greater than the angle θ10 of inclination. In addition, the angle formed by light LTi incident along the normal and light LTr reflected by the reflective surface 321 is expressed as an angle θ21 of reflection. The angle θ21 of reflection is greater than the angle θ20 of reflection. For example, the thickness T1 is 3.54 μm. In addition, a cross-sectional photograph taken by an electron microscope is checked to find that the angle θ11 of inclination is 42° and the helical pitch P1 is 618 nm. Moreover, it is confirmed that the refractive anisotropy Δn of the liquid crystal layer 3 increases because of the penetration by the additive 4, compared to that of the comparative example. As a result, the center wavelength λm of the selective reflection band Δλ in Example 1 shifts to a long wavelength side by approximately 50 nm, compared to that of comparative example.

In this manner, by the penetration by the additive 4 the liquid crystal layer 3 is swelled and the angle of inclination of the reflective surface 321 can be made greater. In addition, in the example shown in the figure, in the comparative example, light LTr is reflected at the interface between the transparent substrate 1 and the air four times; whereas in Example 1, light LTr is reflected at the interface between the transparent substrate 1 and the air twice. That is, in Example 1, the number of times of reflection of light LTr guided through the liquid crystal optical element 100 can be reduced, compared to that in the comparative example. This suppresses problems such as the scattering of light LTr due to foreign matter adhering to the transparent substrate 1 and the liquid crystal layer 3 or a minute crack and the leakage of light LTr to the outside of the liquid crystal optical element 100. It is therefore possible to suppress a loss when guiding light.

Example 2

First, through steps ST1 to ST7 shown in FIG. 10, the alignment film 2 and the liquid crystal layer 3 are formed on the transparent substrate 1.

Figure 15:
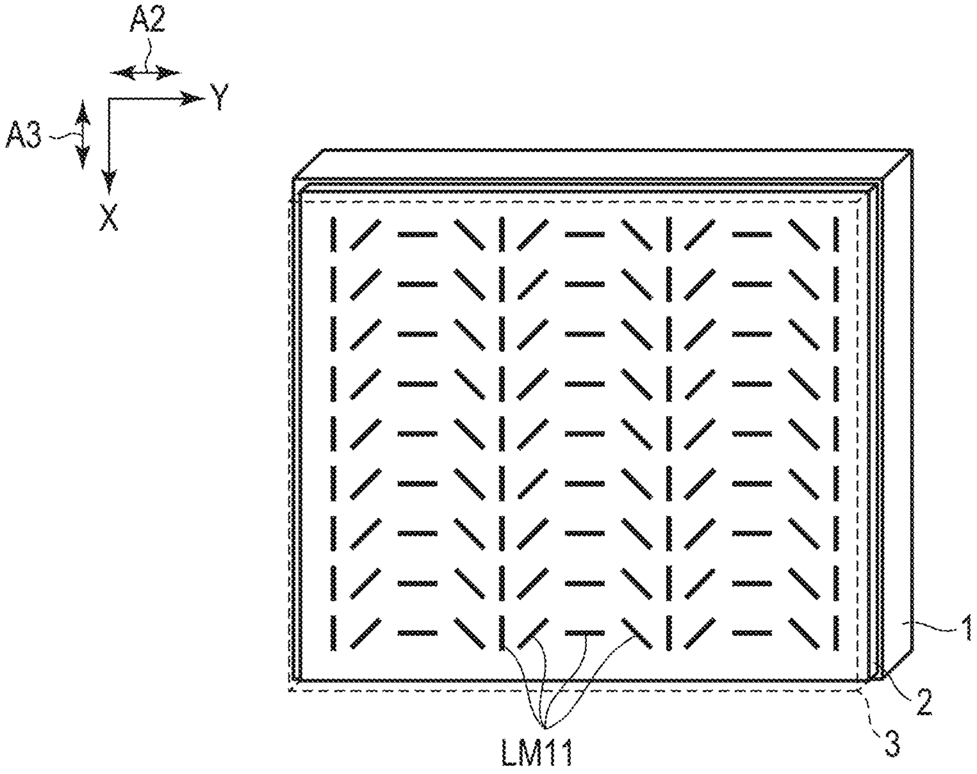
FIG. 15 is a diagram showing the alignment pattern of liquid crystal molecules LM11 located close to an alignment film 2.

FIG. 15 is a diagram showing the alignment pattern of the liquid crystal molecules LM11 located close to the alignment film 2. The liquid crystal layer 3 is indicated by a broken line.

The alignment directions of the liquid crystal molecules LM11 arranged in the second direction A2 are different by equal angles. In the example shown in the figure, the alignment directions are different by equal angles clockwise from the left to the right of the figure in the second direction A2.

In contrast, the alignment directions of the liquid crystal molecules LM11 arranged in the third direction A3 are substantially identical.

Figure 16:
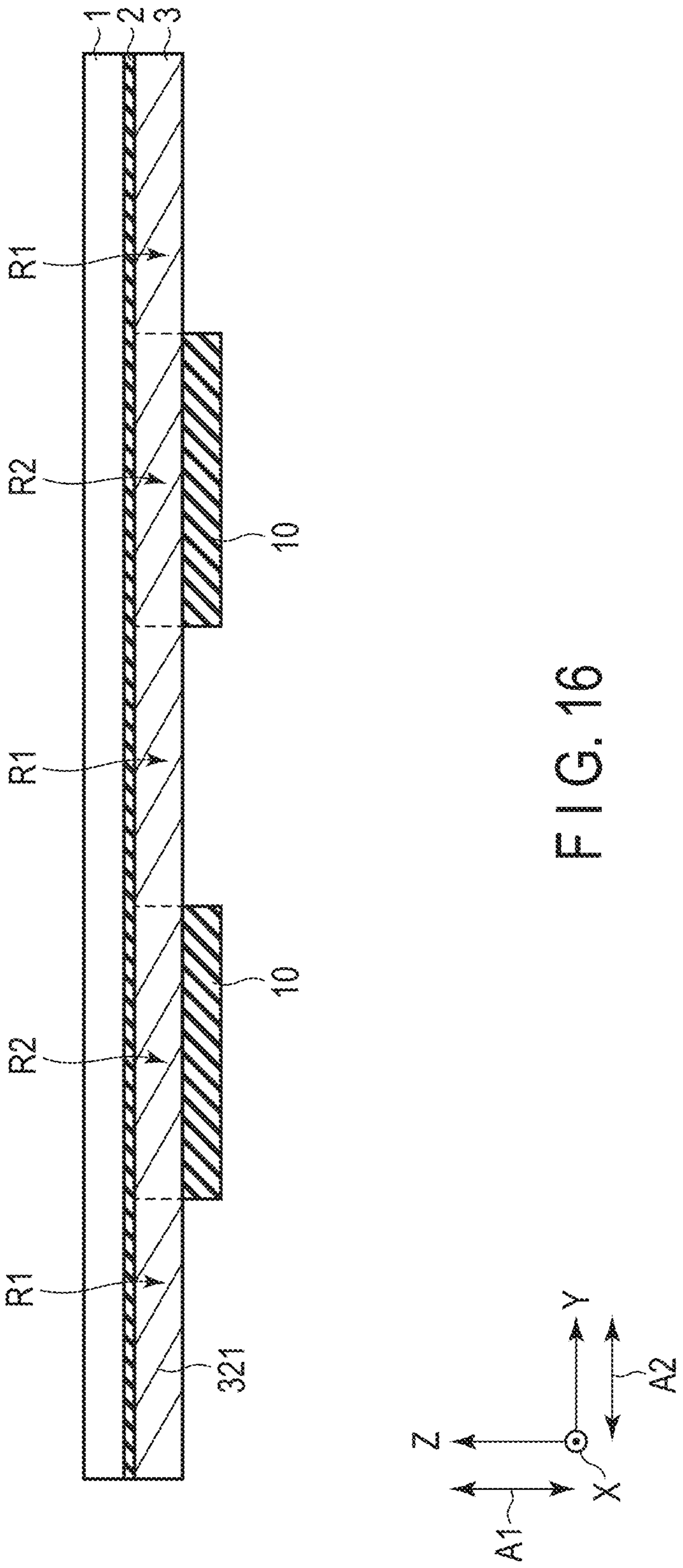
FIG. 16 is a diagram for explaining the step of attaching protective sheets 10 to the liquid crystal layer 3.

FIG. 16 is a diagram for explaining the step of attaching protective sheets 10 to the liquid crystal layer 3.

The protective sheets 10 are, for example, sheets formed of polyimide, and are chemical-resistant and waterproof. Each of the protective sheets 10 is formed into, for example, the shape of a strip extending in one direction. The protective sheets 10 are attached on the liquid crystal layer 3 with a distance between them. For example, the protective sheets 10 are attached to the liquid crystal layer 3 such that their long sides extend in the third direction A3 shown in FIG. 15. The protective sheets 10 may be attached to the liquid crystal layer 3 such that their long sides extend in the second direction A2.

In Example 2, of the liquid crystal layer 3, the regions to which the protective sheets 10 are not attached are referred to as first regions R1 and the regions to which the protective sheets 10 are attached are referred to as second regions R2. The first regions R1 and the second regions R2 are arranged alternately in the second direction A2.

Figure 17:
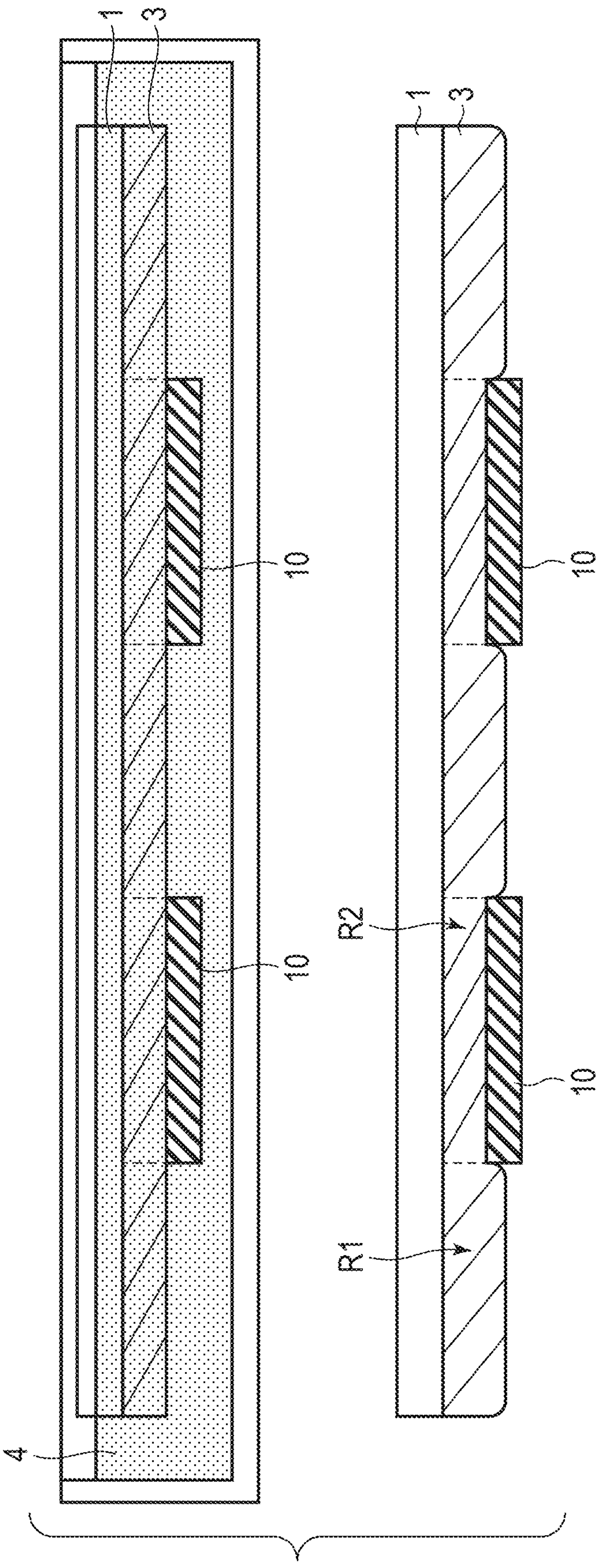
FIG. 17 is a diagram for explaining the step of making the additive 4 penetrate the liquid crystal layer 3.

FIG. 17 is a diagram for explaining the step of making the additive 4 penetrate the liquid crystal layer 3. In FIG. 17 and the following figures, the illustration of the alignment film is omitted.

First, as shown in the upper part of FIG. 17, the liquid additive 4 is prepared. Here, 4'-pentyl-4-biphenylcarbonitrile (another name: 5CB) is applied as the additive 4. The additive 4 in the chamber is set to a liquid state by being heated in advance to 50° C., above the NI point. Then, the liquid crystal layer 3 is soaked in the additive 4.

Then, as shown in the lower part of FIG. 17, excess additive 4 is removed by using a spinner and the liquid crystal layer 3 is dried. The first regions R1 are penetrated by the additive 4, and the second regions R2 are hardly penetrated by the additive 4.

In the dried liquid crystal layer 3, the second regions R2, to which the protective sheets 10 are attached, hardly change in appearance. In contrast, the first regions R1 swell because of the penetration by the additive 4 and the color of their appearance changes, compared to that before the penetration by the additive 4.

Figure 18:
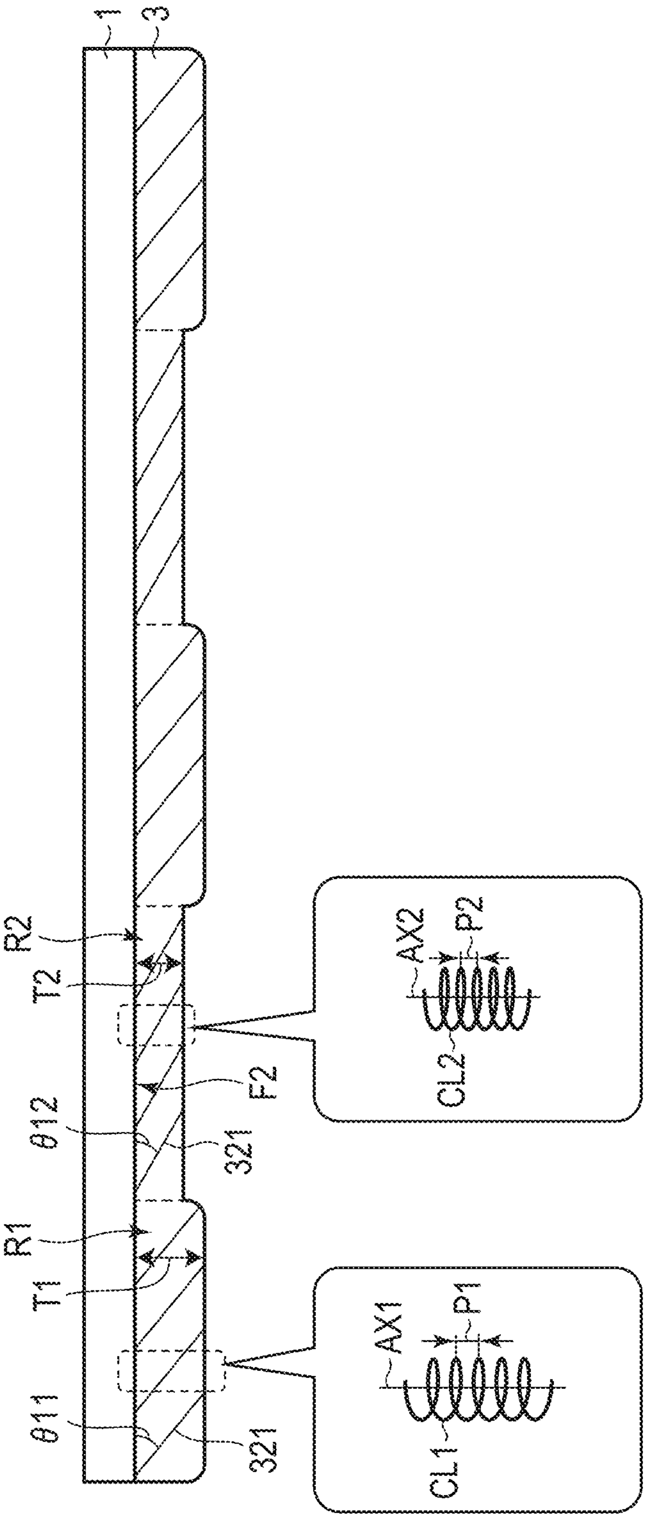
FIG. 18 is a cross-sectional view showing the liquid crystal layer 3 after the protective sheets 10 are peeled off.

FIG. 18 is a cross-sectional view showing the liquid crystal layer 3 after the protective sheets 10 are peeled off.

The first regions R1 comprise a first cholesteric liquid crystal CL1 as a cholesteric liquid crystal. The second regions R2 comprise a second cholesteric liquid crystal CL2 as a cholesteric liquid crystal.

The first cholesteric liquid crystal CL1 swells along the helical axis AX1 compared to the second cholesteric liquid crystal CL2. That is, the thickness T1 of the first regions R1 is different from the thickness T2 of the second regions R2 and is greater than the thickness T2. In addition, the first helical pitch P1 of the first cholesteric liquid crystal CL1 is different from the second helical pitch P2 of the second cholesteric liquid crystal CL2 and is greater than the second helical pitch P2. Thus, the center wavelength of the selective reflection band reflected by the first regions R1 is longer than the center wavelength of the selective reflection band reflected by the second regions R2.

In addition, the first angle θ11 of inclination of the reflective surface 321 formed in the first regions R1 with respect to the second main surface F2 is different from the second angle θ12 of inclination of the reflective surface 321 formed in the second regions R2 with respect to the second main surface F2, and is greater than the second angle θ12 of inclination. In the example shown in the figure, the first angle θ11 of inclination and the second angle θ12 of inclination are both clockwise acute angles with respect to the second main surface F2.

Figure 19:
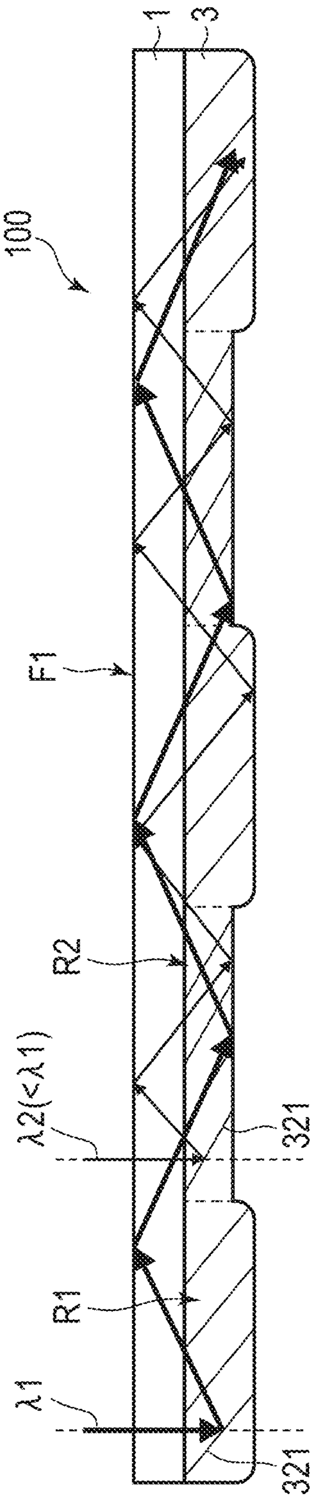
FIG. 19 is a diagram for explaining the optical action of the liquid crystal optical element.

FIG. 19 is a diagram for explaining the optical action of the liquid crystal optical element 100. In the figure, the normal of the transparent substrate 1 is indicated by a broken line. In FIG. 19, light of a wavelength λ1 incident on the liquid crystal optical element 100 along the normal and light reflected by the reflective surface 321 of the first regions R1 are indicated by thick lines, light of a wavelength λ2 incident on the liquid crystal optical element 100 along the normal and light reflected by the reflective surface 321 of the second regions R2 are indicated by thin lines, and the illustration of light transmitted through the liquid crystal optical element 100 is omitted. The wavelength λ1 is longer than the wavelength λ2.

Light of the wavelength λ1 incident through the first main surface F1 is reflected by the reflective surface 321 of the first regions R1, and is then guided through the inside of the liquid crystal optical element 100 while being reflected repeatedly at the interface between the transparent substrate 1 and the air and the interface between the liquid crystal layer 3 and the air.

Light of the wavelength λ2 incident though the first main surface F1 is reflected by the reflective surface 321 of the second regions R2, and is then guided through the inside of the liquid crystal optical element 100 while being reflected repeatedly at the interface between the transparent substrate 1 and the air and the interface between the liquid crystal layer 3 and the air. In the example shown in the figure, light of the wavelength λ1 and light of the wavelength λ2 are both guided through the inside of the transparent substrate 1 from the left to the right of the figure.

In Example 2, it is possible to widen the selective reflection band by making the additive penetrate the liquid crystal layer 3 partly, in addition to achieving the above-described advantages of Example 1.

Example 3

Figure 20:
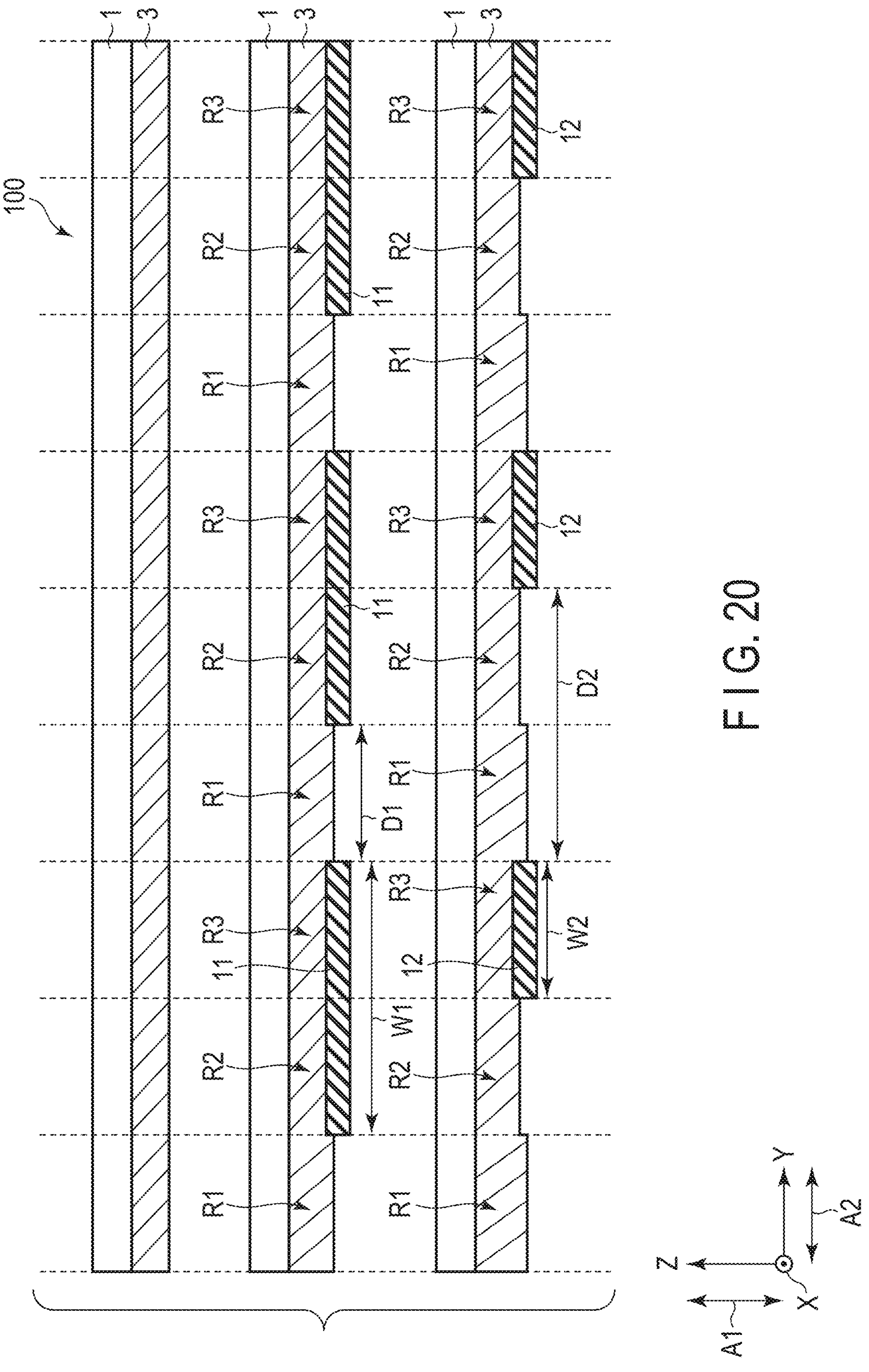
FIG. 20 is a diagram for explaining the step of making the additive penetrate the liquid crystal layer 3.

FIG. 20 is a diagram for explaining the step of making the additive penetrate the liquid crystal layer 3. In FIG. 20 and the following figures, the illustration of the alignment film is omitted.

As shown in the upper part of FIG. 20, first, through steps ST1 to ST7 shown in FIG. 10, the liquid crystal layer 3 is formed on the transparent substrate 1.

Then, as shown in the middle part of FIG. 20, first protective sheets 11 are attached on the liquid crystal layer 3 with a distance between them. In the example shown in the figure, the width W1 in the second direction A2 of the first protective sheets 11 is greater than the distance D1 between the first protective sheets 11.

Then, the liquid crystal layer 3 is soaked in the additive. In Example 3, too, 4'-pentyl-4-biphenylcarbonitrile (another name: 5CB), heated to the NI point or higher, is applied as the liquid additive. Then, excess additive is removed by using a spinner, and the liquid crystal layer 3 is dried. After that, the first protective sheets 11 are peeled off.

Then, as shown in the lower part of FIG. 20, second protective sheets 12 are attached on the liquid crystal layer 3 with a distance between them. In the example shown in the figure, the width W2 in the second direction A2 of the second protective sheets 12 is less than the distance D2 between the second protective sheets 12. In addition, the width W2 is less than the width W1, and the distance D2 is greater than the distance D1. Then, the liquid crystal layer 3 is soaked in the additive, excess additive is removed by using a spinner, and the liquid crystal layer 3 is dried. Then, the second protective sheets 12 are peeled off.

In Example 3, of the liquid crystal layer 3, the regions to which the first protective sheets 11 and the second protective sheets 12 are not attached are referred to as the first regions R1, the regions to which the first protective sheets 11 are attached and the second protective sheets 12 are not attached are referred to as the second regions R2, and the regions to which the first protective sheets 11 and the second protective sheets 12 are attached are referred to as third regions R3. The first regions R1 are penetrated by the additive through at least two steps, the second regions R2 are penetrated by the additive but the amount of additive added to the second regions R2 is smaller the amount of additive added to the first regions R1, and the third regions R3 are hardly penetrated by the additive.

In the liquid crystal layer 3, the third regions R3 hardly change in appearance. In contrast, the second regions R2 swell because of the penetration by the additive, and the color of their appearance changes, compared to that before the penetration by the additive. In addition, the first regions R1 swell because of the further penetration by the additive, and the color of their appearance changes to a color of a wavelength longer than that of the color of the second regions R2.

Figure 21:
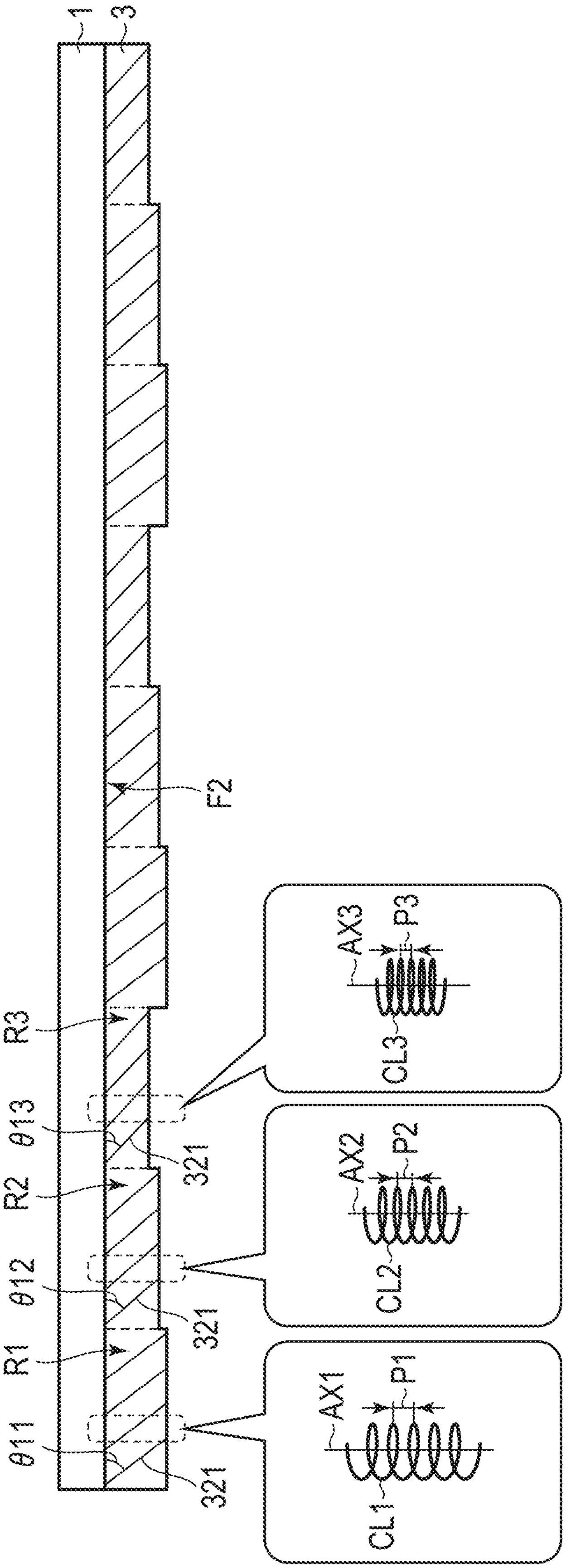
FIG. 21 is a cross-sectional view showing the liquid crystal layer 3 after second protective sheets 12 are peeled off.

FIG. 21 is a cross-sectional view showing the liquid crystal layer 3 after the second protective sheets 12 are peeled off.

The first regions R1 comprise the first cholesteric liquid crystal CL1 as a cholesteric liquid crystal. The second regions R2 comprise the second cholesteric liquid crystal CL2 as a cholesteric liquid crystal. The third regions R3 comprise a third cholesteric liquid crystal CL3 as a cholesteric liquid crystal.

The first cholesteric liquid crystal CL1 swells along the helical axis AX1 compared to the second cholesteric liquid crystal CL2. The first helical pitch P1 of the first cholesteric liquid crystal CL1 is greater than the second helical pitch P2 of the second cholesteric liquid crystal CL2. Thus, the center wavelength of the selective reflection band reflected by the first regions R1 is longer than the center wavelength of the selective reflection band reflected by the second regions R2.

The second cholesteric liquid crystal CL2 swells along a helical axis AX2 compared to the third cholesteric liquid crystal CL3. The second helical pitch P2 of the second cholesteric liquid crystal CL2 is greater than the third helical pitch P3 of the third cholesteric liquid crystal CL3. Thus, the center wavelength of the selective reflection band reflected by the second regions R2 is longer than the center wavelength of the selective reflection band reflected by the third regions R3.

In addition, the first angle θ11 of inclination of the reflective surface 321 formed in the first regions R1 with respect to the second main surface F2 is greater than the second angle θ12 of inclination of the reflective surface 321 formed in the second regions R2 with respect to the second main surface F2. Moreover, the second angle θ12 of inclination is greater than the third angle θ13 of inclination of the reflective surface 321 formed in the third regions R3 with respect to the second main surface F2. In the example shown in the figure, the first angle θ11 of inclination, the second angle θ12 of inclination, and the third angle θ13 of inclination are all clockwise acute angles with respect to the second main surface F2.

Figure 22:
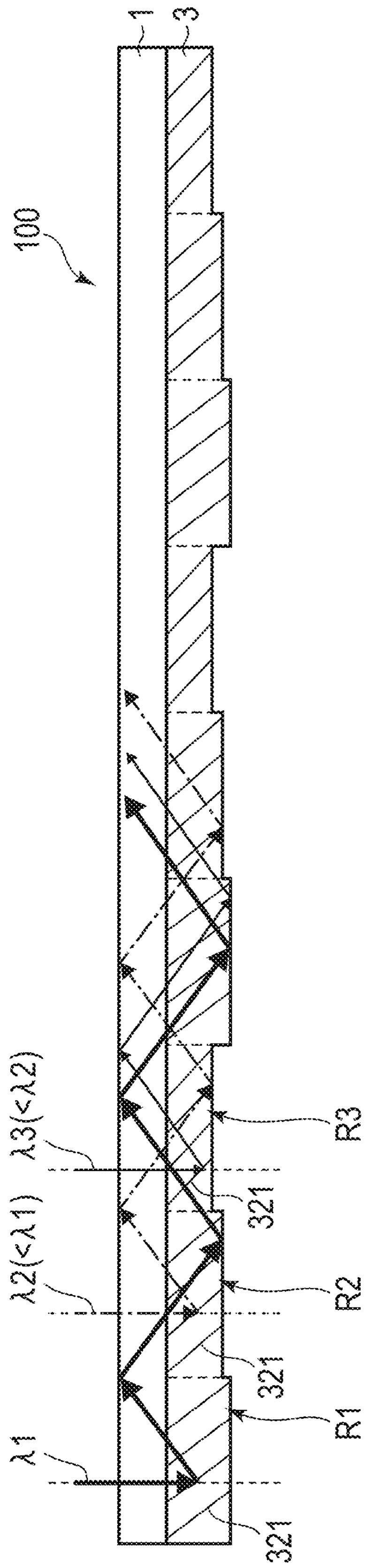
FIG. 22 is a diagram for explaining the optical action of the liquid crystal optical element.

FIG. 22 is a diagram for explaining the optical action of the liquid crystal optical element 100. In the figure, the normal of the transparent substrate 1 is indicated by a broken line. In FIG. 22, light of the wavelength λ1 incident on the liquid crystal optical element 100 along the normal and light reflected by the reflective surface 321 of the first regions R1 are indicated by thick lines, light of the wavelength λ2 incident on the liquid crystal optical element 100 along the normal and light reflected by the reflective surface 321 of the second regions R2 are indicated by alternate long and short dashed lines, light of a wavelength λ3 incident on the liquid crystal optical element 100 along the normal and light reflected by the reflective surface 321 of the third regions R3 are indicated by thin lines, and the illustration of light transmitted through the liquid crystal optical element 100 is omitted. The wavelength λ1 is longer than the wavelength λ2 and the wavelength λ2 is longer than the wavelength λ3.

Light of the wavelength λ1 incident through the first main surface F1 is reflected by the reflective surface 321 of the first regions R1, and is then guided through the inside of the liquid crystal optical element 100 while being reflected repeatedly at the interface between the transparent substrate 1 and the air and the interface between the liquid crystal layer 3 and the air.

Light of the wavelength λ2 incident though the first main surface F1 is reflected by the reflective surface 321 of the second regions R2, and is then guided through the inside of the liquid crystal optical element 100 while being reflected repeatedly at the interface between the transparent substrate 1 and the air and the interface between the liquid crystal layer 3 and the air.

Light of the wavelength λ3 incident through the first main surface F1 is reflected by the reflective surface 321 of the third regions R3, and is then guided through the inside of the liquid crystal optical element 100 while being reflected repeatedly at the interface between the transparent substrate 1 and the air and the interface between the liquid crystal layer 3 and the air. In the example shown in the figure, light of the wavelength λ1, light of the wavelength λ2, and light of the wavelength λ3 are all guided through the inside of the transparent substrate 1 from the left to the right of the figure.

In Example 3, it is possible to further widen the selective reflection band by making the amounts of additive added to the liquid crystal layer 3 differ between regions, in addition to achieving the above-described advantages of Example 1.

Example 4

First, through steps ST1 to ST7 shown in FIG. 10, the alignment film 2 and the liquid crystal layer 3 are formed on the transparent substrate 1.

Figure 23:
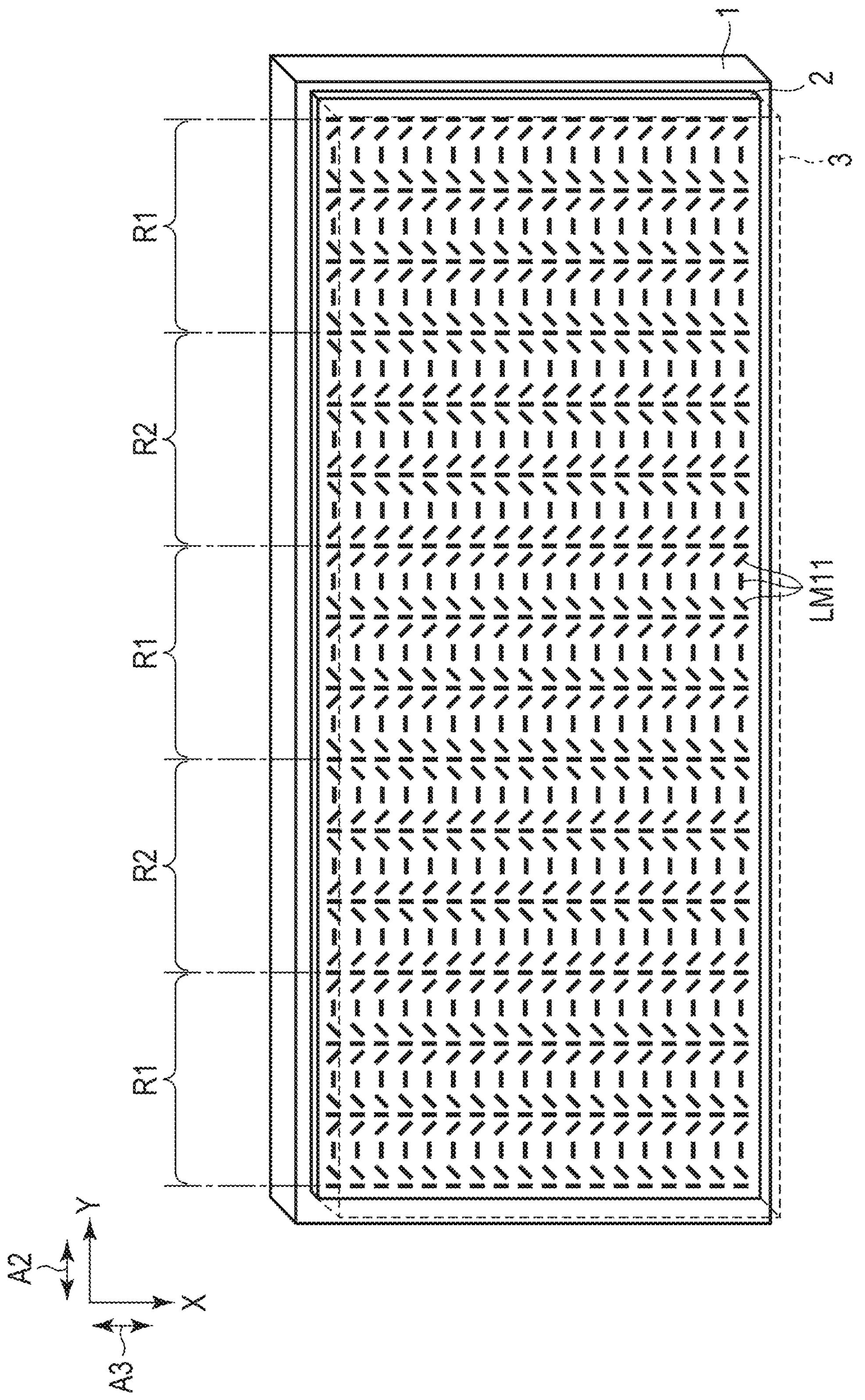
FIG. 23 is a diagram showing the alignment pattern of the liquid crystal molecules LM11 located close to the alignment film 2.

FIG. 23 is a diagram showing the alignment pattern of the liquid crystal molecules LM11 located close to the alignment film 2. The liquid crystal layer 3 is indicated by a broken line.

The alignment directions of the liquid crystal molecules LM11 arranged in the second direction A2 are different by equal angles. The liquid crystal layer 3 comprises the first regions R1 and the second regions R2 as regions having alignment patterns different from each other. In the example shown in the figure, of the liquid crystal layer 3, the regions in which the alignment directions are different by equal angles clockwise from the left to the right of the figure in the second direction A2 are referred to as the first regions R1. In addition, of the liquid crystal layer 3, the regions in which the alignment directions are different by equal angles counterclockwise from the left to the right of the figure in the second direction A2 are referred to as the second regions R2. The first regions R1 and the second regions R2 are arranged alternately in the second direction A2.

In contrast, the alignment directions of the liquid crystal molecules LM11 arranged in the third direction A3 are substantially identical.

As described in Example 2 above, the protective sheets are not attached to the first regions R1 and the additive penetrates them, and the protective sheets are attached to the second regions R2 to suppress the penetration by the additive. The first regions R1 thereby swell compared to the second regions R2. The helical pitch of the cholesteric liquid crystals of the first regions R1 is greater than the helical pitch of the cholesteric liquid crystals of the second regions R2, which is not explained in detail. Thus, the center wavelength of the selective reflection band reflected by the first regions R1 is longer than the center wavelength of the selective reflection band reflected by the second regions R2.

Figure 24:
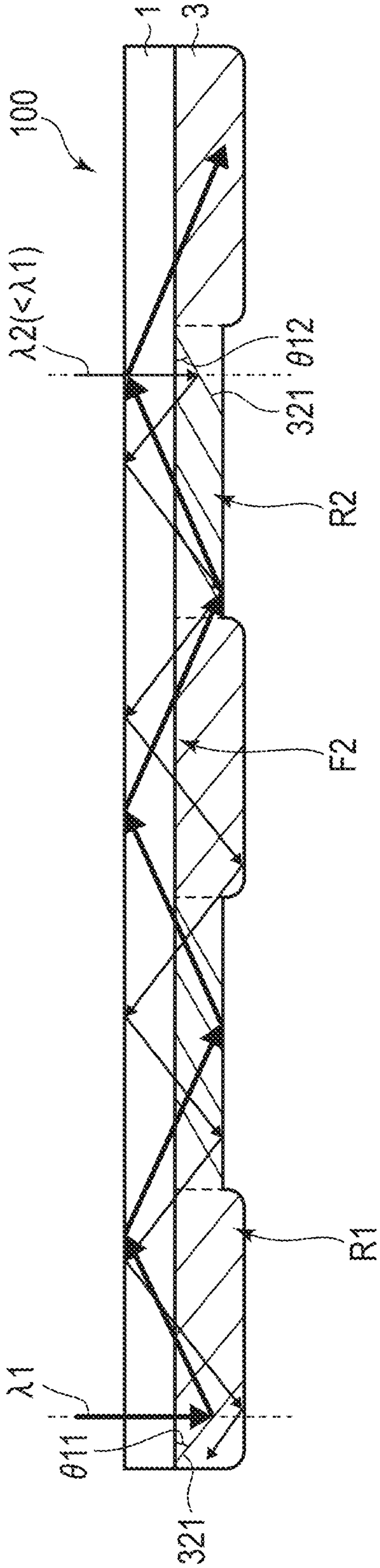
FIG. 24 is a diagram for explaining the optical action of the liquid crystal optical element.

FIG. 24 is a diagram for explaining the optical action of the liquid crystal optical element 100. In the figure, the normal of the transparent substrate 1 is indicated by a broken line. In FIG. 24, light of the wavelength λ1 incident on the liquid crystal optical element 100 along the normal and light reflected by the reflective surface 321 of the first regions R1 are indicated by thick lines, light of the wavelength λ2 incident on the liquid crystal optical element 100 along the normal and light reflected by the reflective surface 321 of the second regions R2 are indicated by thin lines, and the illustration of light transmitted through the liquid crystal optical element 100 is omitted. The wavelength λ1 is longer than the wavelength λ2. In FIG. 24, the illustration of the alignment film is omitted.

As described with reference to FIG. 23, the alignment pattern of the first regions R1 is different from the alignment pattern of the second regions R2. However, the turning direction of the cholesteric liquid crystals of the first regions R1 is identical to the turning direction of the cholesteric liquid crystals of the second regions R2.

The first angle θ11 of inclination of the reflective surface 321 formed in the first regions R1 with respect to the second main surface F2 is a clockwise acute angle with respect to the second main surface F2. The second angle θ12 of inclination of the reflective surface 321 formed in the second regions R2 with respect to the second main surface F2 is a counterclockwise acute angle with respect to the second main surface F2. In addition, the first angle θ11 of inclination is greater than the second angle θ12 of inclination.

Light of the wavelength λ1 incident through the first main surface F1 is reflected by the reflective surface 321 of the first regions R1, and is then guided through the inside of the liquid crystal optical element 100 from the left to the right of the figure while being reflected repeatedly by the interface between the transparent substrate 1 and the air and the interface between the liquid crystal layer 3 and the air.

Light of the wavelength λ2 incident through the first main surface F1 is reflected by the reflective surface 321 of the second regions R2, and is then guided through the inside of the liquid crystal optical element 100 from the right to the left of the figure while being reflected repeatedly by the interface between the transparent substrate 1 and the air and the interface between the liquid crystal layer 3 and the air.

In Example 4, it is possible to widen the selective reflection band by making the additive penetrate the liquid crystal layer 3 partly and to further guide light of different wavelengths in different directions, in addition to achieving the above-described advantages of Example 1.

Application Example

Next, a photovoltaic cell device 200 will be described as an application example of the liquid crystal optical element 100 of the present embodiment.

FIG. 25 is a diagram showing an example of the outside of the photovoltaic cell device 200.

The photovoltaic cell device 200 comprises the above-described liquid crystal optical element 100 and a power generation device 210. The power generation device 210 is, for example, provided along one side of the liquid crystal optical element 100. The one side of the liquid crystal optical element 100, which is opposed to the power generation device 210, is a side along the side surface S1 of the transparent substrate 1 shown in FIG. 1. In the photovoltaic cell device 200, the liquid crystal optical element 100 functions as a light guide element which guides light of a predetermined wavelength to the power generation device 210. The power generation device 210 may be provided along a plurality of sides of the liquid crystal optical element 100.

The power generation device 210 comprises a plurality of photovoltaic cells. The photovoltaic cells receive light and convert the energy of received light into power. That is, the photovoltaic cells generate power from received light. The type of photovoltaic cells is not particularly limited. For example, the photovoltaic cells are silicon photovoltaic cells, compound photovoltaic cells, organic photovoltaic cells, perovskite photovoltaic cells, or quantum dot photovoltaic cells. The silicon photovoltaic cells include photovoltaic cells comprising amorphous silicon, photovoltaic cells comprising polycrystalline silicon, etc.

FIG. 26 is a diagram for explaining the operation of the photovoltaic cell device 200.

The first main surface F1 of the transparent substrate 1 faces outdoors. The liquid crystal layer 3 faces indoors. In FIG. 26, the illustration of an alignment film is omitted.

The liquid crystal layer 3 is, for example, configured to reflect first circularly polarized light of infrared rays I as shown in FIG. 1. The liquid crystal layer 3 may be configured to reflect each of first circularly polarized light and second circularly polarized light of infrared rays I.

Infrared rays I reflected by the liquid crystal layer 3 is guided through the liquid crystal optical element 100 toward the side surface S1. The power generation device 210 receives the infrared rays I transmitted through the side surface S1 and generates power.

Visible light V and ultraviolet rays U of solar light are transmitted through the liquid crystal optical element 100. In particular, a first component (blue component), a second component (green component), and a third component (red component), which are main components of visible light V, are transmitted through the liquid crystal optical element 100. Thus, the coloration of light transmitted through the photovoltaic cell device 200 can be suppressed. In addition, the decline of the transmittance of visible light V in the photovoltaic cell device 200 can be suppressed.

Furthermore, since the above-described liquid crystal optical element 100 is applied, the band which can be used for power generation can be enlarged and the power generation efficiency (conversion efficiency) can be improved.

As described above, the present embodiment can provide a liquid crystal optical element which can suppress a loss when guiding light, and a method for manufacturing the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal optical element comprising:

a transparent substrate comprising a main surface;

an alignment film disposed on the main surface; and a liquid crystal layer overlapping the alignment film and comprising a cholesteric liquid crystal including liquid crystal molecules stacked helically and an additive exhibiting a liquid crystalline property, wherein in the liquid crystal layer, a reflective surface along which alignment directions of the liquid crystal molecules are identical is inclined with respect to the main surface, the liquid crystal layer comprises first regions and second regions arranged alternately along the main surface, each of the first regions comprises a first cholesteric liquid crystal of a first helical pitch as the cholesteric liquid crystal, each of the second regions comprises a second cholesteric liquid crystal of a second helical pitch as the cholesteric liquid crystal, the second helical pitch is different from the first helical pitch, and in the liquid crystal layer, a thickness of the first regions is different from a thickness of the second regions.

2. A liquid crystal optical element comprising:

a transparent substrate comprising a main surface;

an alignment film disposed on the main surface; and a liquid crystal layer overlapping the alignment film and comprising a cholesteric liquid crystal including liquid crystal molecules stacked helically and an additive exhibiting a liquid crystalline property, wherein in the liquid crystal layer, a reflective surface along which alignment directions of the liquid crystal molecules are identical is inclined with respect to the main surface, the liquid crystal layer comprises first regions and second regions arranged alternately along the main surface, each of the first regions comprises a first cholesteric liquid crystal of a first helical pitch as the cholesteric liquid crystal, each of the second regions comprises a second cholesteric liquid crystal of a second helical pitch as the cholesteric liquid crystal, the second helical pitch is different from the first helical pitch, and a first angle of inclination of the reflective surface formed in the first regions with respect to the main surface is different from a second angle of inclination of the reflective surface formed in the second regions with respect to the main surface.

3. The liquid crystal optical element of claim 2, wherein the first angle of inclination is a clockwise acute angle with respect to the main surface, and the second angle of inclination is a counterclockwise acute angle with respect to the main surface.

4. A liquid crystal optical element comprising:

a transparent substrate comprising a main surface;

an alignment film disposed on the main surface; and a liquid crystal layer overlapping the alignment film and comprising a cholesteric liquid crystal including liquid crystal molecules stacked helically and an additive exhibiting a liquid crystalline property, wherein in the liquid crystal layer, a reflective surface along which alignment directions of the liquid crystal molecules are identical is inclined with respect to the main surface, and the additive is formed of one of a nematic liquid crystal material and a smectic liquid crystal material.

5. The liquid crystal optical element of claim 4, wherein the additive is formed of one of a cyanobiphenyl-based material, an analog of the cyanobiphenyl-based material, a fluorinated biphenyl-based material, an analog of the fluorinated biphenyl-based material, another biphenyl-based material, an analog of the other biphenyl-based material, a phenyl ester-based material, a Schiff base-based material, a cyclohexane phenyl tolan-based material, a cyclohexane ester phenyl tolan-based material, an alkoxy cyclohexane ester phenyl tolan-based material, a fluoro cyclohexane ester phenyl tolan-based material, a tetracyclic ester tolan-based material, a phenyl tolan ester-based material, a cyano phenyl tolan ester-based material, a fluoro phenyl tolan ester-based material, and a bifluoro phenyl tolan ester-based material.

* * * * *